(12) United States Patent
Koponen et al.

(10) Patent No.: US 8,966,024 B2
(45) Date of Patent: Feb. 24, 2015

(54) ARCHITECTURE OF NETWORKS WITH MIDDLEBOXES

(71) Applicant: Nicira, Inc., Palo Alto, CA (US)

(72) Inventors: Teemu Koponen, San Francisco, CA (US); Ronghua Zhang, San Jose, CA (US); Pankaj Thakkar, Santa Clara, CA (US); Martin Casado, Portola Valley, CA (US)

(73) Assignee: Nicira, Inc., Palo Alto, CA (US)

( * ) Notice: Subject to any disclaimer, the term of this patent is extended or adjusted under 35 U.S.C. 154(b) by 136 days.

(21) Appl. No.: 13/678,498

(22) Filed: Nov. 15, 2012

(65) Prior Publication Data

US 2013/0132531 A1 May 23, 2013

Related U.S. Application Data

(60) Provisional application No. 61/560,279, filed on Nov. 15, 2011.

(51) Int. Cl.
*G06F 15/177* (2006.01)
*H04L 12/24* (2006.01)
(Continued)

(52) U.S. Cl.
CPC .......... *G06F 15/177* (2013.01); *H04L 41/0823* (2013.01); *G06F 9/455* (2013.01); *H04L 41/0803* (2013.01); *H04L 63/0218* (2013.01); *H04L 45/74* (2013.01); *H04L 12/2424* (2013.01); *H04L 41/0813* (2013.01); *H04L 41/0889* (2013.01); *H04L 61/2503* (2013.01); *H04L 49/70* (2013.01)
USPC ........... 709/220; 709/221; 709/222; 709/223; 709/238

(58) Field of Classification Search
USPC .......................... 709/220, 221, 222, 223, 238
See application file for complete search history.

(56) References Cited

U.S. PATENT DOCUMENTS 5,504,921 A   4/1996   Dev et al.
5,550,816 A   8/1996   Hardwick et al.
(Continued)

FOREIGN PATENT DOCUMENTS

EP       1653688      5/2006
JP       2003-124976  4/2003
(Continued)

OTHER PUBLICATIONS

Joseph, Dilip, et al., "A Policy-aware Switching Layer for Date Centers," Jun. 24, 2008, 26 pages, Electrical Engineering and Computer Sciences, University of California, Berkeley, CA, USA.*
(Continued)

*Primary Examiner* — Liangche A Wang
(74) *Attorney, Agent, or Firm* — Adeli LLP

(57) ABSTRACT

Some embodiments provide a system for implementing a logical network that includes a set of end machines, a first logical middlebox, and a second logical middlebox connected by a set of logical forwarding elements. The system includes a set of nodes. Each of several nodes includes (i) a virtual machine for implementing an end machine of the logical network, (ii) a managed switching element for implementing the set of logical forwarding elements of the logical network, and (iii) a middlebox element for implementing the first logical middlebox of the logical network. The system includes a physical middlebox appliance for implementing the second logical middlebox.

26 Claims, 13 Drawing Sheets

(51) Int. Cl.
*G06F 9/455* (2006.01)
*H04L 29/06* (2006.01)
*H04L 12/741* (2013.01)
*H04L 29/12* (2006.01)
*H04L 12/931* (2013.01)

(56) References Cited

U.S. PATENT DOCUMENTS

| | | |
|---|---|---|
| 5,751,967 A | 5/1998 | Raab et al. |
| 6,104,699 A | 8/2000 | Holender et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,880,089 B1 | 4/2005 | Bommareddy et al. |
| 7,046,630 B2 | 5/2006 | Abe et al. |
| 7,055,173 B1 | 5/2006 | Chaganty et al. |
| 7,197,572 B2 | 3/2007 | Matters et al. |
| 7,209,439 B2 | 4/2007 | Rawlins et al. |
| 7,283,473 B2 | 10/2007 | Arndt et al. |
| 7,342,916 B2 | 3/2008 | Das et al. |
| 7,450,598 B2 | 11/2008 | Chen et al. |
| 7,478,173 B1 | 1/2009 | Delco |
| 7,555,002 B2 | 6/2009 | Arndt et al. |
| 7,606,260 B2 | 10/2009 | Oguchi et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,730,486 B2 | 6/2010 | Herington |
| 7,764,599 B2 | 7/2010 | Doi et al. |
| 7,792,987 B1 | 9/2010 | Vohra et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,856,549 B2 | 12/2010 | Wheeler |
| 7,885,276 B1 | 2/2011 | Lin |
| 7,925,850 B1 | 4/2011 | Waldspurger et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,166,201 B2 | 4/2012 | Richardson et al. |
| 8,199,750 B1 | 6/2012 | Schultz et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,456,984 B2 | 6/2013 | Ranganathan et al. |
| 8,611,351 B2 | 12/2013 | Gooch et al. |
| 8,612,627 B1 | 12/2013 | Brandwine |
| 8,644,188 B1 | 2/2014 | Brandwine et al. |
| 8,650,618 B2 | 2/2014 | Asati et al. |
| 2002/0093952 A1 | 7/2002 | Gonda |
| 2002/0161867 A1 | 10/2002 | Cochran et al. |
| 2002/0194369 A1 | 12/2002 | Rawlins et al. |
| 2003/0069972 A1 | 4/2003 | Yoshimura et al. |
| 2003/0079000 A1* | 4/2003 | Chamberlain ............... 709/220 |
| 2003/0093481 A1 | 5/2003 | Mitchell et al. |
| 2004/0049701 A1 | 3/2004 | Le Pennec et al. |
| 2004/0054793 A1 | 3/2004 | Coleman |
| 2004/0098505 A1 | 5/2004 | Clemmensen |
| 2005/0018669 A1 | 1/2005 | Arndt et al. |
| 2005/0021683 A1 | 1/2005 | Newton et al. |
| 2005/0050377 A1 | 3/2005 | Chan et al. |
| 2005/0083953 A1 | 4/2005 | May |
| 2006/0092976 A1 | 5/2006 | Lakshman et al. |
| 2006/0221961 A1 | 10/2006 | Basso et al. |
| 2007/0140128 A1 | 6/2007 | Klinker et al. |
| 2007/0233838 A1 | 10/2007 | Takamoto et al. |
| 2007/0266433 A1 | 11/2007 | Moore |
| 2007/0283348 A1 | 12/2007 | White |
| 2007/0286185 A1* | 12/2007 | Eriksson et al. ............... 370/389 |
| 2008/0002579 A1 | 1/2008 | Lindholm et al. |
| 2008/0005293 A1 | 1/2008 | Bhargava et al. |
| 2008/0049621 A1 | 2/2008 | McGuire et al. |
| 2008/0071900 A1 | 3/2008 | Hecker et al. |
| 2008/0072305 A1* | 3/2008 | Casado et al. ................... 726/11 |
| 2008/0163207 A1 | 7/2008 | Reumann et al. |
| 2008/0189769 A1 | 8/2008 | Casado et al. |
| 2008/0196100 A1 | 8/2008 | Madhavan et al. |
| 2008/0225853 A1 | 9/2008 | Melman et al. |
| 2008/0240122 A1 | 10/2008 | Richardson et al. |
| 2009/0031041 A1 | 1/2009 | Clemmensen |
| 2009/0063750 A1 | 3/2009 | Dow |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0150527 A1* | 6/2009 | Tripathi et al. ............... 709/221 |
| 2009/0161547 A1* | 6/2009 | Riddle et al. .................. 370/236 |
| 2009/0240924 A1 | 9/2009 | Yasaki et al. |
| 2009/0249470 A1* | 10/2009 | Litvin et al. ..................... 726/13 |
| 2009/0249473 A1 | 10/2009 | Cohn |
| 2009/0292858 A1 | 11/2009 | Lambeth et al. |
| 2009/0300210 A1 | 12/2009 | Ferris |
| 2009/0303880 A1* | 12/2009 | Maltz et al. ................... 370/235 |
| 2010/0046530 A1* | 2/2010 | Hautakorpi et al. .......... 370/401 |
| 2010/0046531 A1 | 2/2010 | Louati et al. |
| 2010/0115101 A1* | 5/2010 | Lain et al. ..................... 709/227 |
| 2010/0125667 A1 | 5/2010 | Soundararajan |
| 2010/0131636 A1 | 5/2010 | Suri et al. |
| 2010/0138830 A1 | 6/2010 | Astete et al. |
| 2010/0153554 A1 | 6/2010 | Anschutz et al. |
| 2010/0165877 A1 | 7/2010 | Shukla et al. |
| 2010/0214949 A1 | 8/2010 | Smith et al. |
| 2010/0254385 A1 | 10/2010 | Sharma et al. |
| 2010/0257263 A1 | 10/2010 | Casado et al. |
| 2010/0275199 A1* | 10/2010 | Smith et al. ........................ 718/1 |
| 2010/0284402 A1* | 11/2010 | Narayanan .................... 370/390 |
| 2011/0075674 A1 | 3/2011 | Li et al. |
| 2011/0085559 A1 | 4/2011 | Chung et al. |
| 2011/0119748 A1* | 5/2011 | Edwards et al. ................. 726/12 |
| 2011/0225594 A1 | 9/2011 | Iyengar et al. |
| 2011/0261825 A1 | 10/2011 | Ichino |
| 2011/0299534 A1 | 12/2011 | Koganti et al. |
| 2011/0310899 A1 | 12/2011 | Alkhatib et al. |
| 2012/0014386 A1 | 1/2012 | Xiong et al. |
| 2012/0236734 A1 | 9/2012 | Sampath et al. |
| 2012/0246637 A1 | 9/2012 | Kreeger et al. |
| 2013/0073743 A1 | 3/2013 | Ramasamy et al. |
| 2013/0121209 A1 | 5/2013 | Padmanabhan et al. |
| 2013/0125120 A1 | 5/2013 | Zhang et al. |
| 2013/0125230 A1 | 5/2013 | Koponen et al. |
| 2013/0128891 A1 | 5/2013 | Koponen et al. |
| 2013/0132532 A1 | 5/2013 | Zhang et al. |
| 2013/0132533 A1 | 5/2013 | Padmanabhan et al. |
| 2013/0132536 A1 | 5/2013 | Zhang et al. |

FOREIGN PATENT DOCUMENTS

| | | |
|---|---|---|
| JP | 2003-318949 | 11/2003 |
| WO | WO 2005/112390 | 11/2005 |
| WO | WO 2008/095010 | 8/2008 |

OTHER PUBLICATIONS

Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
Foster, Nate, et al., "Frenetic: A Network Programming Language," ICFP '11, Sep. 19-21, 2011, 13 pages, Tokyo, Japan.

(56) References Cited

OTHER PUBLICATIONS

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.
Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.
Loo, Boon Thau, et al., "Declarative Routing: Extensible Routing with Declarative Queries," In Proc. of SIGCOMM, Aug. 21-26, 2005, 14 pages, Philadelphia, PA, USA.
Loo, Boon Thau, et al., "Implementing Declarative Overlays," In Proc. of SOSP, Oct. 2005, 16 pages, Brighton, UK.
Sekar, Vyas, et al., "Design and Implementation of a Consolidated Middlebox Architecture," In Proc. of NSDI, Month Unknown, 2012, 14 pages.
Shenker, Scott, et al., "The Future of Networking, and the Past of Protocols," Dec. 2, 2011, pp. 1-30, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
WO 2013/074847 with International Search Report, May 23, 2013, Nicira, Inc.
WO 2013/074831 with International Search Report, May 23, 2013, Nicira, Inc.
WO 2013/074855 with International Search Report, May 23, 2013, Nicira, Inc.
WO 2013/074827 with International Search Report, May 23, 2013, Nicira, Inc.
WO 2013/074844 with International Search Report, May 23, 2013, Nicira, Inc.
WO 2013/074828 with International Search Report, May 23, 2013, Nicira, Inc.
WO 2013/074842 with International Search Report, May 23, 2013, Nicira, Inc.
Andersen, David, et al., "Resilient Overlay Networks," Oct. 2001, 15 pages, 18th ACM Symp. on Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown , "Cisco VN-Link: Virtualization-Aware Networking," Month Unknown, 2009, 10 pages, Cisco Systems, Inc.
Author Unknown, "Cisco VN-Link: Virtual Machine-Aware Networking," Apr. 2009, 2 pages, Cisco Systems, Inc.
Author Unknown, "Intel 82599 10 Gigabit Ethernet Controller: Datasheet, Revision: 2.73," Dec. 2011, 930 pages, Intel Corporation.
Author Unknown, "Virtual Machine Device Queues," White Paper, Month Unknown, 2007, pp. 1-4, Intel Corporation.
Author Unknown , "VMare for Linux Networking Support," Date Unknown but prior to Nov. 17, 1999, pp. 1-5, VMWare, Inc.
Barham, Paul, et al., "Xen and the Art of Virtualization," Oct. 19-22, 2003, pp. 1-14, SOSP'03, Bolton Landing New York, USA.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Popa, Lucian, et al., "Building Extensible Networks with Rule-Based Forwarding," In USENIX OSDI, Month Unknown, 2010, pp. 1-14.
Yang, L., et al., "Forwarding and Control Element Separation (ForCES) Framework," Apr. 2004, pp. 1-40, The Internet Society.
Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown, 2009, pp. 147-148, IEEE.
Portions of prosecution history of U.S. Appl. No. 13/678,485, Jun. 26, 2014, Nicira, Inc.

(56) References Cited

OTHER PUBLICATIONS

Portions of prosecution history of U.S. Appl. No. 13/678,518, Aug. 18, 2014, Nicira, Inc.
Portions of prosecution history of U.S. Appl. No. 13/678,504, Jul. 9, 2014, Nicira, Inc.
Portions of prosecution history of U.S. Appl. No. 13/678,512, Jul. 23, 2014, Nicira, Inc.
Wang, Wei-Ming, et al., "Analysis and Implementation of an Open Programmable Router Based on Forwarding and Control Element Separation," Sep. 2008, pp. 769-779, Journal of Computer Science and Technology.

* cited by examiner

ARCHITECTURE OF NETWORKS WITH MIDDLEBOXES

CLAIM OF BENEFIT TO PRIOR APPLICATION

This application claims the benefit of U.S. Provisional Application 61/560,279, entitled "Virtual Middlebox Services", filed Nov. 15, 2011. U.S. Application 61/560,279 is incorporated herein by reference.

BACKGROUND

Many current enterprises have large and sophisticated networks comprising switches, hubs, routers, middleboxes (e.g., firewalls, load balancers, source network address translation, etc.), servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments provide a system that allows a user to specify a logical network that includes one or more middleboxes (e.g., firewalls, load balancers, network address translators, intrusion detection systems (IDS), wide area network (WAN) optimizers, etc.). The system implements the logical network by distributing logical forwarding elements (e.g., logical switches, logical routers, etc.) across numerous managed switching elements operating on numerous physical machines that also host virtual machines of the logical network. In implementing such a logical network, the system of some embodiments implements different middleboxes in different manners. For instance, the system may implement a first middlebox in a distributed manner (e.g., with the middlebox implemented across numerous managed middlebox elements that also operate on the physical machines alongside the managed switching elements) and a second middlebox in a centralized manner (e.g., as a single appliance or virtual machine, as a cluster). In some embodiments, the determination as to whether to implement a particular middlebox in a distributed or centralized matter is based on the state sharing requirements between different middlebox elements when the middlebox is distributed.

In some embodiments, the spectrum for possible implementation of logical middleboxes into a physical network ranges from a fully distributed middlebox to a fully centralized middlebox, with different middleboxes implemented at different points along such a spectrum. In addition, a single type of middlebox may be implemented in both a centralized or a distributed fashion, including within the same managed logical network. For example, a user might want a first firewall for filtering all traffic incoming from external networks and a second firewall for filtering traffic between different subnets of the logical network. In some cases, the best solution may be to implement the first firewall as a single appliance to which all external incoming traffic is forwarded, while implementing the second firewall in a distributed fashion across all of the physical machines on which virtual machines of the logical network are hosted.

At one end of the spectrum is a fully distributed middlebox architecture. In this case, the middlebox is implemented across numerous nodes (physical host machines). Each of the physical host machines, in some embodiments, hosts at least one virtual machine in the logical network containing the logical middlebox. In addition, a managed switching element runs on each of the host machines, in order implement the logical forwarding elements of the logical network. As a particular physical host machine may host virtual machines in more than one logical network (e.g., belonging to different tenants), both the distributed middlebox and the managed switching element running on the host may be virtualized in order to implement middleboxes and logical forwarding elements from different logical networks.

In some embodiments, a middlebox may be implemented in such a distributed fashion when minimal sharing of state (or none at all) is required between the middlebox instances. At least some types of middleboxes are stateful, in that they establish states for connections between machines (e.g., between two virtual machines in the network, between a virtual machine in the network and an external machine, etc.). In some embodiments, the middlebox establishes a state for each transport layer connection (e.g., TCP connection, UDP connection). In the distributed case of some embodiments, a middlebox element operating at a particular host machine creates states for the transport connections passing through it, but does not need to share these states with the other middlebox elements operating on the other host machines. When the states only apply to the virtual machines hosted on the particular host machine, and the middlebox does not need to perform any analysis using state information established for other virtual machines, then the middlebox may be distributed. Examples of such middleboxes include source network address translation (S-NAT), destination network address translation (D-NAT), and firewalls.

In addition, some embodiments allow distribution of middleboxes that have a minimal level of state sharing. For example, load balancers may query the machines across which they balance traffic to determine the current level of traffic sent to each of the machines, then distribute this to the other load balancers. However, each load balancing element can run a load balancing algorithm on its own, and perform the queries at regular intervals, rather than sharing state information with every other load balancing element every time a packet is routed to one of the virtual machines, or every time a transport (e.g., TCP, UDP, etc.) connection is established with one of the virtual machines.

On the other side of the spectrum is the fully centralized middlebox implementation. In such a centralized implementation, the managed switching elements in the hosts send all traffic for the middlebox to process to the same middlebox appliance. This single middlebox may be a separate physical machine or a separate virtual machine operating within the physical network on its own host machine (or in the same host as one of the virtual machines in the network). When a managed switching element identifies that a packet should be sent to the middlebox, the switching element sends the packet through the physical network to the middlebox (e.g., via a tunnel). The middlebox processes the packet, then sends the packet (actually a new packet) to another managed switching element for processing (e.g., a pool node).

Some embodiments use such a centralized middlebox when a distributed middlebox would require packet sharing at data plane speeds. That is, for each traffic packet processed by a middlebox element, the element would have to update all of the other middlebox instances with the state change resulting from the packet processing. Thus, each traffic packet passing through a middlebox would result in an explosion of additional traffic in order to update all of the other middlebox instances. Examples of such middleboxes include IDSs and WAN optimizers. For instance, in order to properly monitor for intrusions, IDS processing needs to know about all connections within the network. As such, if the IDS were distributed, new state updates would have to be sent for every packet processed by a distributed IDS element.

As a third option, some embodiments use a cluster architecture for some middleboxes that is similar to the fully centralized architecture, except that the cluster acts as a centralized resource pool rather than a single physical machine. A middlebox cluster (e.g., a cluster of IDS boxes) may be beneficial in some embodiments when the network (or networks) using the middlebox is larger, and a single appliance may not have enough resources (e.g., memory, processing power, etc.) to handle the larger deployment. However, when the cluster is a middlebox that requires knowledge of all of the state information, then this state information will be shared between the various machines in the cluster. In some embodiments, the middlebox cluster may be a better option than a single appliance when the analysis does not require state updates on a per packet basis, but rather a per transport connection (or several updates per connection, while less often than per packet) basis. In order to perform the high-speed state sharing required, some embodiments link the middlebox machines in the cluster via a separate dedicated high-speed connection for sharing the state information.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a system that allows a user to specify a logical network that includes one or more middleboxes (e.g., firewalls, load balancers, network address translators, intrusion detection systems (IDS), wide area network (WAN) optimizers, etc.). The system implements the logical network by distributing logical forwarding elements (e.g., logical switches, logical routers, etc.) across numerous managed switching elements operating on numerous physical machines that also host virtual machines of the logical network.

In implementing such a logical network, the system of some embodiments implement different middleboxes in different manners. For instance, the system may implement a first middlebox in a distributed manner (e.g., with the middlebox implemented across numerous managed middlebox elements that also operate on the physical machines alongside the managed switching elements) and a second middlebox in a centralized manner (e.g., as a single appliance or virtual machine, as a cluster). In some embodiments, the determination as to whether to implement a particular middlebox in a distributed or centralized matter is based on the state sharing requirements between different middlebox elements when the middlebox is distributed.

Figure 1:
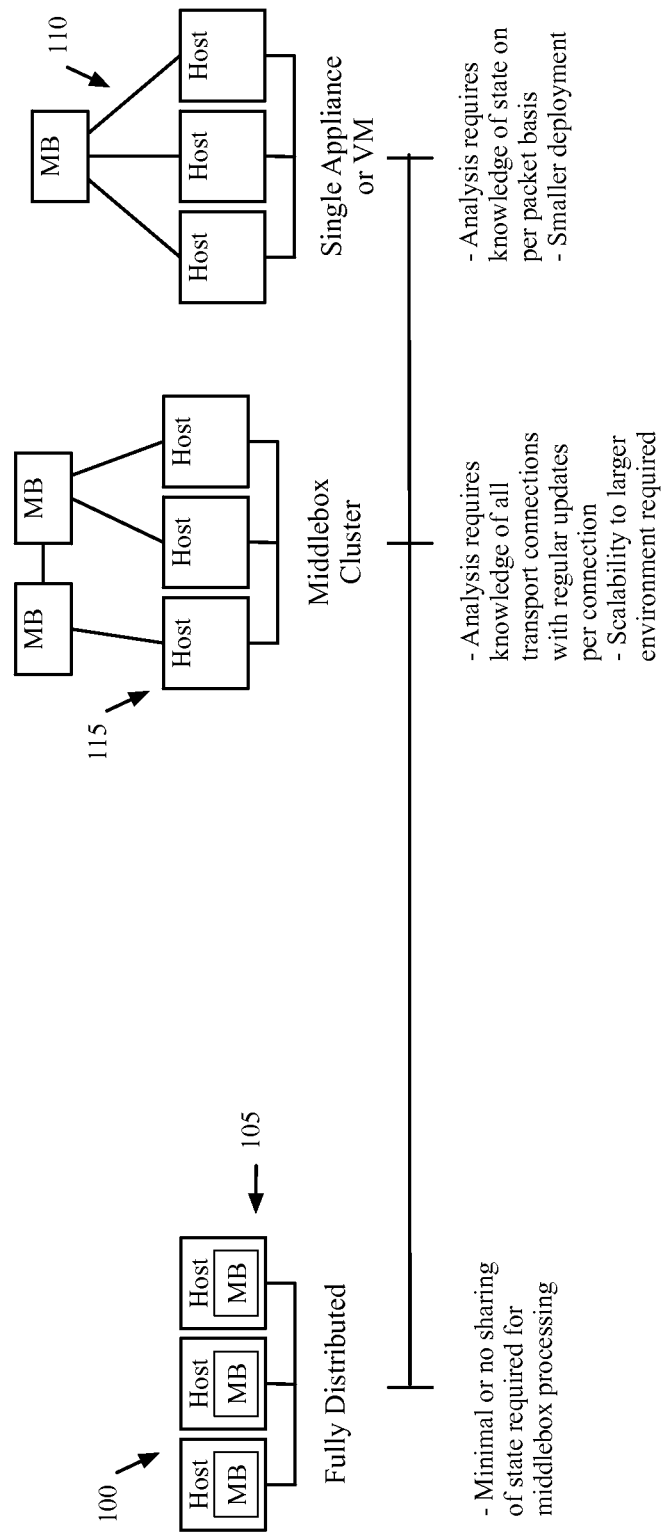
FIG. 1 conceptually illustrates a spectrum for the implementation of logical middleboxes into a physical network, ranging from a fully distributed middlebox to a fully centralized middlebox.

FIG. 1 conceptually illustrates a spectrum 100 for the implementation of logical middleboxes into a physical network, ranging from a fully distributed middlebox to a fully centralized middlebox. As mentioned, different middleboxes may be implemented at different points along this spectrum. In addition, a single type of middlebox may be implemented in both a centralized or a distributed fashion, including within the same managed logical network. For example, a user might want a first firewall for filtering all traffic incoming from external networks and a second firewall for filtering traffic between different subnets of the logical network. In some cases, the best solution may be to implement the first firewall as a single appliance to which all external incoming traffic is forwarded, while implementing the second firewall in a distributed fashion across all of the physical machines on which virtual machines of the logical network are hosted.

At the left end of spectrum 100 is a fully distributed middlebox architecture 105 of some embodiments. As shown in the diagram, the middlebox is implemented across numerous nodes (physical host machines). Each of the physical host machines, in some embodiments, hosts at least one virtual machine in the logical network containing the logical middlebox. In addition, a managed switching element runs on each of the host machines, in order implement the logical forwarding elements (e.g., logical routers, logical switches) of the logical network. As a particular physical host machine may host virtual machines in more than one logical network (e.g., belonging to different tenants), both the distributed middlebox and the managed switching element running on the host may be virtualized in order to implement middleboxes and logical forwarding elements from different logical networks. In some embodiments, the middlebox is implemented as a module or set of modules that runs within the hypervisor of the host machine.

As indicated in the figure, a middlebox may be implemented in such a distributed fashion when minimal sharing of state (or none at all) is required between the middlebox instances. At least some types of middleboxes are stateful, in that they establish states for connections between machines (e.g., between two virtual machines in the network, between a virtual machine in the network and an external machine, etc.). In some embodiments, the middlebox establishes a state for each transport layer connection (e.g., TCP connection, UDP connection). In the distributed case of some embodiments, a middlebox element operating at a particular host machine creates states for the transport connections passing through it, but does not need to share these states with the other middlebox elements operating on the other host machines. When the states only apply to the virtual machines hosted on the particular host machine, and the middlebox does not need to perform any analysis using state information established for other virtual machines, then the middlebox may be distributed. Examples of such middleboxes include source network address translation (S-NAT), destination network address translation (D-NAT), and firewalls.

In addition, some embodiments allow distribution of middleboxes that have a minimal level of state sharing. For example, load balancers may query the machines across which they balance traffic to determine the current level of traffic sent to each of the machines, then distribute this to the other load balancers. However, each load balancing element can run a load balancing algorithm on its own, and perform the queries at regular intervals, rather than sharing state information with every other load balancing element every time a packet is routed to one of the virtual machines, or every time a transport (e.g., TCP, UDP, etc.) connection is established with one of the virtual machines.

On the other side of the spectrum 100 is the fully centralized middlebox implementation 110. In this implementation, the managed switching elements in the hosts send all traffic for the middlebox to process to the same middlebox appliance. This single middlebox may be a separate physical machine or a separate virtual machine operating within the physical network on its own host machine (or in the same host as one of the virtual machines in the network). When a managed switching element identifies that a packet should be sent to the middlebox, the switching element sends the packet through the physical network to the middlebox (e.g., via a tunnel). The middlebox processes the packet, then sends the packet (actually a new packet) to another managed switching element for processing.

In some embodiments, the managed switching element to which the new packet is sent is a pool node. A pool node, in some embodiments, is a particular type of managed switching element located at the network interior (i.e., not directly connected to any of the virtual machines at the network edges) for handling traffic that the edge switching elements (i.e., those located on the host machines, directly connected to the virtual machines) are not able to process. In other embodiments, rather than send the packet to a pool node, the middlebox sends the traffic to a managed switching element built directly into the middlebox appliance.

Some embodiments use such a centralized middlebox when a distributed middlebox would require packet sharing at data plane speeds. That is, for each traffic packet processed by a middlebox element, the element would have to update all of the other middlebox instances with the state change resulting from the packet processing. Thus, each traffic packet passing through a middlebox would result in an explosion of additional traffic in order to update all of the other middlebox instances. Examples of such middleboxes include IDSs and WAN optimizers. For instance, in order to properly monitor for intrusions, IDS processing needs to know about all connections within the network. As such, if the IDS were distributed, new state updates would have to be sent for every packet processed by a distributed IDS element.

The middlebox cluster architecture 115 is similar to the fully centralized architecture 110, except that the cluster acts as a centralized resource pool rather than a single physical machine. As shown in the figure, a middlebox cluster (e.g., a cluster of IDS boxes) may be beneficial when the network (or networks) using the middlebox is larger, and a single appliance may not have enough resources (e.g., memory, processing power, etc.) to handle the larger deployment. However, when the cluster is a middlebox that requires knowledge of all of the state information, then this state information will be shared between the various machines in the cluster. In some embodiments, the middlebox cluster may be a better option than a single appliance when the analysis does not require state updates on a per packet basis, but rather a per transport connection (or several updates per connection, while less often than per packet) basis. In order to perform the high-speed state sharing required, some embodiments link the middlebox machines in the cluster via a separate dedicated high-speed connection for sharing the state information.

The above illustrates examples of different implementation of logical middleboxes in a network of some embodiments. Several more detailed embodiments are described below. Section I describes the different middlebox architectures of some embodiments. Section II describes the distributed middlebox implementation of some embodiments. Next, Section III describes the network control system of some embodiments for configuring a network in order to implement a logical network that includes one or more middleboxes. Section IV then describes an illustrative example of a network with numerous different middleboxes. Finally, Section V describes an electronic system with which some embodiments of the invention are implemented.

I. Different Middlebox Architectures

As described above, some embodiments implement different middleboxes using different architectures within a managed network. Even for the same logical network topology, some middleboxes are implemented in a distributed fashion (with a middlebox element operating on each host on which a virtual machine of the network operates), while other middleboxes are implemented in a centralized fashion (with a single appliance or cluster to which the managed switching elements on the hosts connect).

Figure 2:
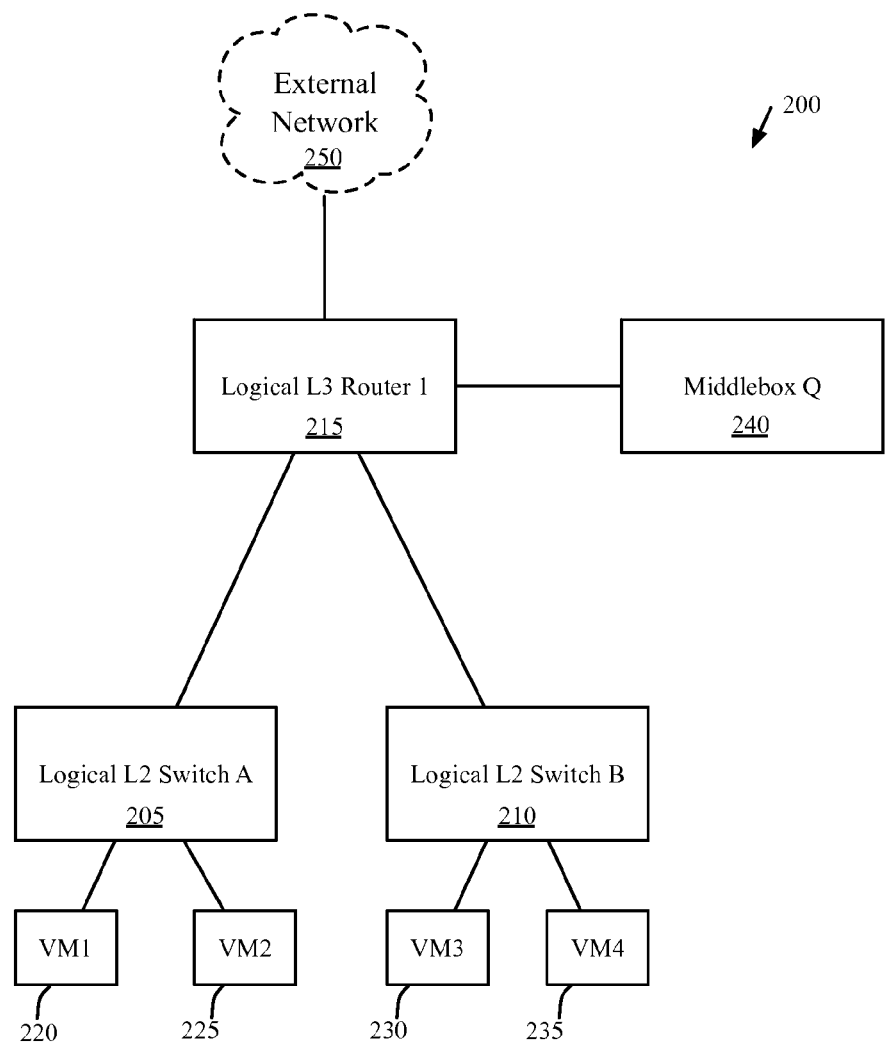
FIG. 2 conceptually illustrates a logical network topology of some embodiments.

FIG. 2 conceptually illustrates a logical network topology 200 of some embodiments. The network topology 200 is a simplified network for purposes of explanation. The network includes two logical L2 switches 205 and 210 connected by a logical L3 router 215. The logical switch 205 connects virtual machines 220 and 225, while the logical switch 210 connects virtual machines 230 and 235. The logical router 215 also connects to an external network 250.

In addition, a middlebox 240 attaches to the logical router 215. One of ordinary skill in the art will recognize that the network topology 200 represents just one particular logical network topology into which a middlebox may be incorporated. In various embodiments, the middlebox may be located directly between two other components (e.g.,), directly between the gateway and logical router (e.g., in order to monitor and process all traffic entering or exiting the logical network), or in other locations in a more complex network.

In the architecture shown in FIG. 2, the middlebox 240 is not located within the direct traffic flow, either from one domain to the other, or between the external world and the domain. Accordingly, packets will not be sent to the middlebox unless routing policies are specified (e.g., by a user such as a network administrator) for the logical router 215 that determine which packets should be sent to the middlebox for processing. Some embodiments enable the use of policy routing rules that forward packets based on data beyond the destination address (e.g., destination IP or MAC address). For example, a user might specify (e.g., through a network controller application programming interface (API) that all packets with a source IP address in the logical subnet switched by logical switch 205, or all packets that enter the network from the external network 250 destined for the logical subnet switched by the logical switch 210, should be directed to the middlebox 240 for processing.

Different middleboxes may perform different functionalities within the network. For instance, a firewall analyzes data packets to determine whether or not the packets should be allowed through (i.e., similar to ACL flow entries). The firewall stores a set of rules (e.g., entered by a user) that determine whether or not the firewall drops (i.e., discards) or allows the packet through (or, in some cases, rejects the packet by dropping the packet and sending an error response back to the sender). In some embodiments, the firewall is a stateful firewall that keeps track of transport (e.g., TCP and/or UDP) connections, and uses the stored state information to make faster packet processing decisions.

Source network address translation (S-NAT) modifies the source IP address of packets in the packet headers. For instance, S-NAT may be used so that the IP addresses of numerous different machines with different IP addresses can be hidden from destination machines by changing the source of packets from the different machines to a single IP address. Destination network address translation (D-NAT) similarly modifies the destination IP address of packets in order to hide the real IP addresses from the source machines. Load balancing is a form of D-NAT that uses various algorithms (e.g., round robin, random assignment, etc.) to balance traffic across numerous destination machines. A load balancer receives a packet for a specific IP address that is exposed to the source machine and modifies the destination IP address of the packet to match up with a particular one of the destination machines selected by the load balancing algorithm.

An intrusion detection system (IDS) is a passive middlebox in some embodiments that monitors the logical network for malicious activities or policy violations. The IDS may examine transport connections (e.g., TCP connections, UDP connections, etc.) to determine whether an attack on the network is occurring.

A WAN optimizer is a middlebox device for increasing the efficiency of data transfers across a WAN (e.g., accelerating the flow of data across the WAN). Examples of WAN optimization techniques include data deduplication, data compression, latency optimization, caching and/or proxying, forward error correction, protocol spoofing, traffic shaping, equalizing, connection limiting, simple rate limiting, etc. While the above is a list of some of the several different middleboxes, one of ordinary skill in the art will recognize that some embodiments may include various different middleboxes that may be implemented in either a distributed or centralized manner.

Figure 3:
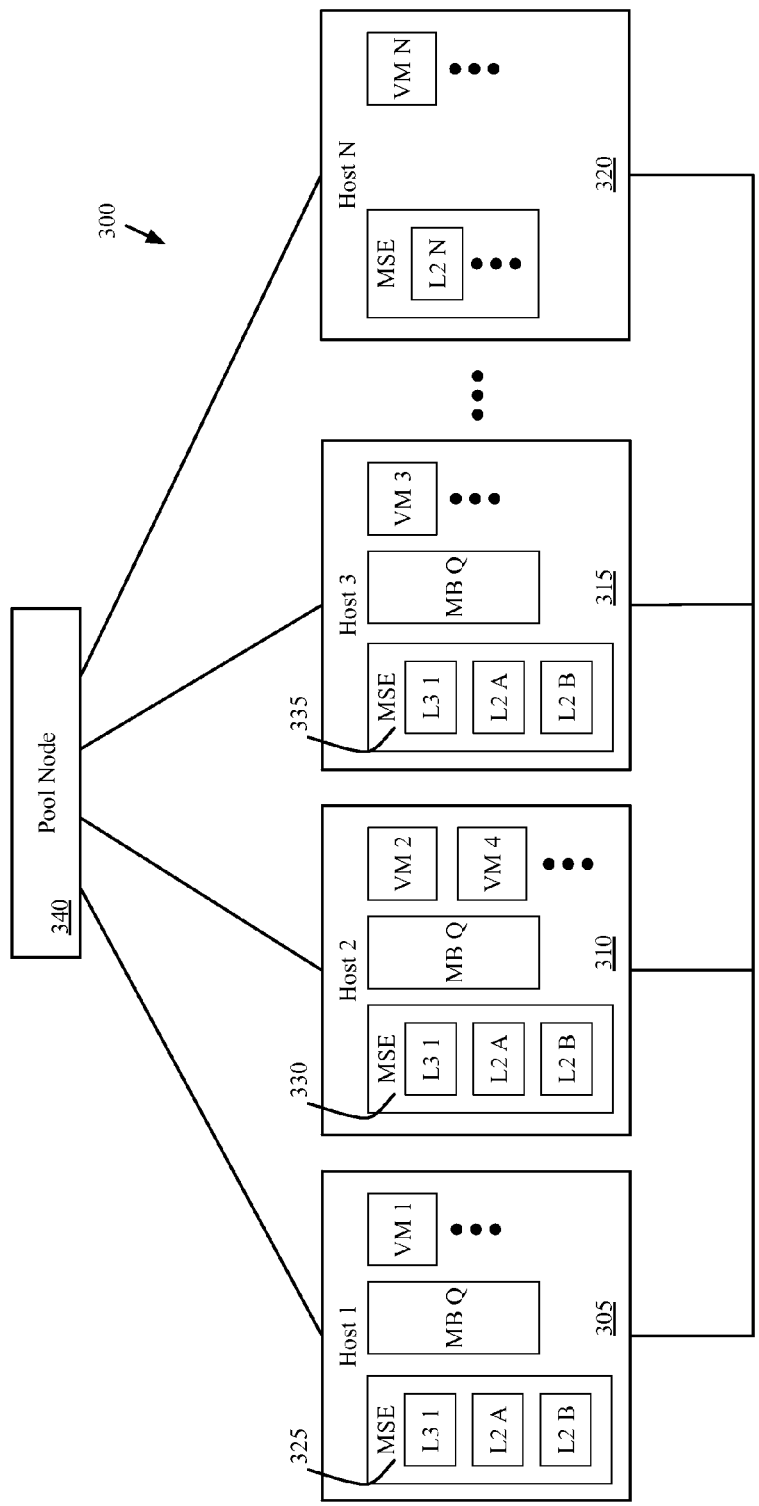
FIG. 3 conceptually illustrates a distributed middlebox implementation of some embodiments.

Depending on the type of middlebox and, in some cases, the type of implementation requested by a user, a middlebox such as that shown in FIG. 2 will be implemented in either a centralized fashion or a distributed fashion. FIG. 3 conceptually illustrates such a distributed implementation 300 of some embodiments. Specifically, FIG. 3 illustrates several nodes, including a first host machine 305, a second host machine 310, a third host machine 315, and an Nth host machine 320. Each of the first three nodes hosts several virtual machines of the network 200, with virtual machine 220 hosted on the first host machine 305, virtual machines 225 and 235 hosted on the second host machine 310, and virtual machine 230 hosted on the third host machine 315.

In addition, each of the host machines includes a managed switching element ("MSE"). The managed switching elements of some embodiments are software forwarding elements that implement logical forwarding elements for one or more logical networks. For instance, the MSEs in the hosts 305-320 include flow entries in forwarding tables that implement the logical forwarding elements of network 200. Specifically, the MSEs on the host machines implement logical switches 205 and 210, as well as the logical router 215. On the other hand, some embodiments only implement logical switches at a particular node when at least one virtual machine connected to the logical switch is located at the node (i.e., only implementing logical switch 205 and logical router 215 in the MSE at host 305. The Nth host 320 does not include any virtual machines from the network 200, and therefore the MSE residing on that host does not implement any logical forwarding elements from the network 200.

The implementation 300 of some embodiments also includes a pool node 340 that connects to the host machines. In some embodiments, the MSEs residing on the host perform first-hop processing. That is, these MSEs are the first forwarding elements a packet reaches after being sent from a virtual machine, and attempt to perform all of the logical switching and routing at this first hop. However, in some cases a particular MSE may not store flow entries containing all of the logical forwarding information for a network, and therefore may not know what to do with a particular packet. In some such embodiments, the MSE sends the packet to a pool node 340 for further processing. These pool nodes are interior managed switching elements which, in some embodiments, store flow entries that encompass a larger portion of the logical network than the edge software switching elements.

Similar to the distribution of the logical switching elements across the hosts on which the virtual machines of network 200 reside, the middlebox 240 is distributed across middlebox elements on these hosts 305-315. In some embodiments, a middlebox module (or set of modules) resides on the host machines (e.g., operating in the hypervisor of the host). When the user sets up the logical network (e.g., network 200), the input includes a configuration from the middlebox. For instance, for a firewall, the user would input a set of rules for packet filtering (e.g., based on IP address, TCP connection, etc.). In some embodiments, a network control system that is used to provision the managed switching elements to implement the logical forwarding elements may also be used to provision the various middlebox elements operating on the host machines. When the user inputs the middlebox configuration into a controller of the network control system, the controller identifies the particular nodes over which the middlebox configuration should be implemented, and distributes the configuration to these nodes (e.g., through a set of controllers).

When one of the virtual machines sends a packet (e.g., to another one of the virtual machines, to an external address, etc.), the packet initially goes to the local managed switching element for processing. The MSE may use its stored flow entries stored to make a forwarding decision to send the packet to the middlebox, in which case some embodiments send the packet to the local middlebox element on the same host. In some embodiments, the middlebox element and the MSE negotiate a software port through which to transfer packets with minimal delay. After the middlebox processes the packet, some embodiments then send the packet back to the MSE through this same port. In some embodiments, this packet is sent from the middlebox to the MSE as a new packet, and therefore requiring new processing by the MSE. In some situations, however, no packets are sent back. For instance, if the middlebox is a firewall, the middlebox may block or drop the packet. In addition, some embodiments of the middlebox are passive, and duplicates of the packets are sent to the middlebox in order for the middlebox to keep track of statistics, but are not sent back to the switching element.

While FIG. 3 illustrates only one logical network implemented across the hosts 305-320, some embodiments implement numerous logical networks (e.g., for different tenants) across the set of hosts. As such, a middlebox element on a particular host might actually store configurations for several different middleboxes belonging to several different logical networks. For example, a firewall element may be virtualized to implement two (or more) different firewalls. These will effectively operate as two separate middlebox instances, such that the middlebox element is sliced into several "virtual" middleboxes (of the same type). In addition, when the MSE on the host sends packets to the middlebox, some embodiments append (e.g., prepend) a slice identifier (or tag) on the packet to identify to which of the several virtual middleboxes the packet is being sent. When multiple middleboxes are implemented on the same middlebox element for a single logical network (e.g., two different load balancers), the slice identifier will need to identify the particular middlebox slice rather than just the logical network to which the packet belongs. Different embodiments may use different slice identifiers for the middleboxes.

Examples of middleboxes that may be distributed in some embodiments include firewalls, S-NATs, and load balancers. In each of these cases, the middlebox plays an active role in the packet processing (i.e., S-NATs and load balancers modify source and destination addresses of the packets, respectively, while firewalls make decisions as to whether to allow or drop packets). However, each of these middlebox elements on a particular node can function on its own without requiring information from the corresponding middlebox elements on the other nodes. Even distributed load balancer elements can each separately load balance incoming traffic across different virtual machines with the assumption that none of the virtual machines are likely to become overloaded so long as the other load balancer elements use the same algorithm. Nevertheless, in some embodiments, the load balancer elements will share state (e.g., after querying the destination virtual machines for usage and health statistics) at some level.

Figure 4:
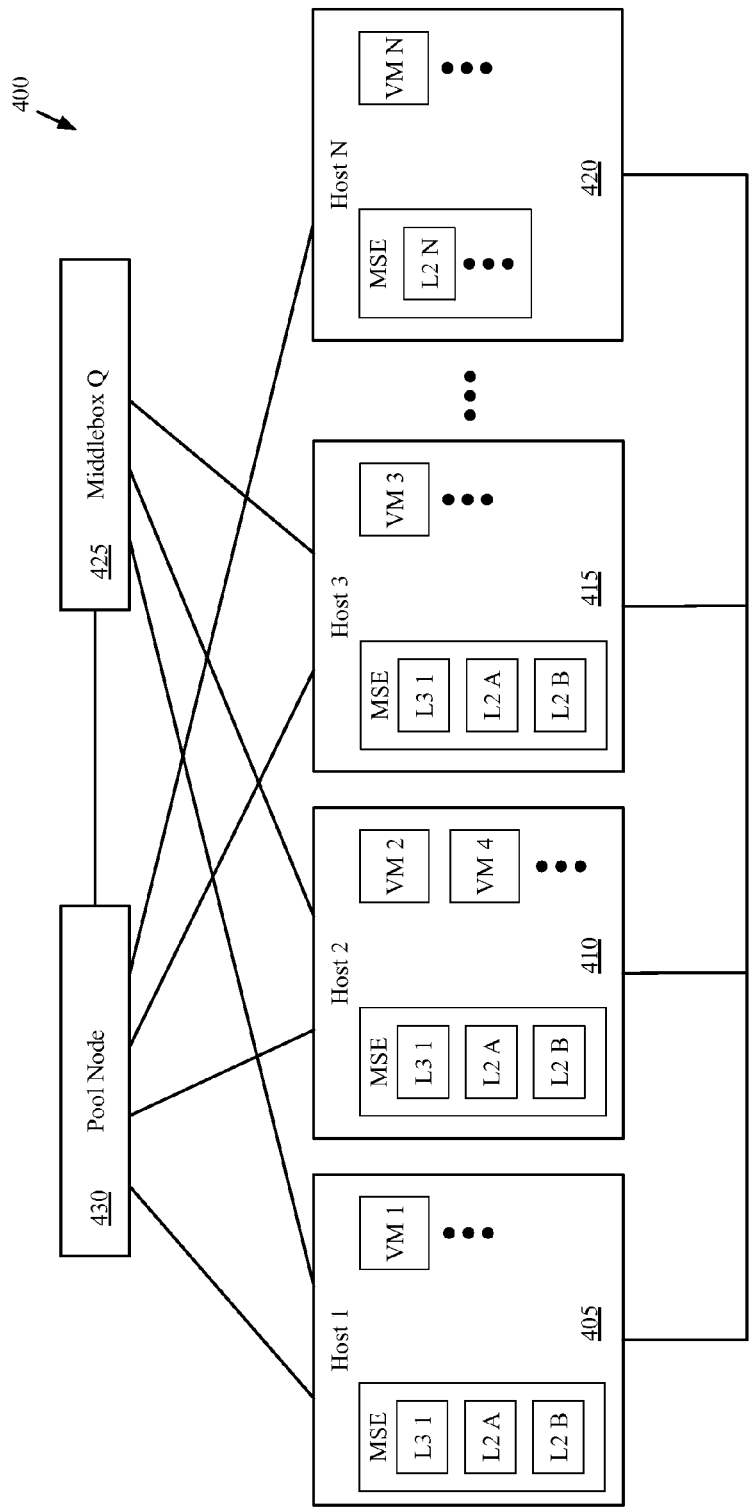
FIG. 4 conceptually illustrates a fully centralized implementation of a middlebox of some embodiments.

FIG. 3, as stated, conceptually illustrates a distributed implementation of some embodiments for the middlebox 240 of logical network 200. FIG. 4, on the other hand, conceptually illustrates a fully centralized implementation 400 of the middlebox 240. This implementation, like the distributed example of FIG. 3, also includes several nodes 405-420 that host the virtual machines 220-235. These virtual machines are again arranged with the first virtual machine 220 hosted on node 405, the second and fourth virtual machines 225 and 235 hosted on node 410, and the third virtual machine 230 hosted on node 415. Similarly, the managed switching elements situated on the nodes 405-415 implement the logical forwarding elements 205-215. As in the distributed middlebox example, the managed switching elements perform first hop processing on packets originating from the virtual machines.

In this example, however, the middlebox 240 is not distributed across the hosts 405-415. Instead, the middlebox is implemented as a single machine external to the hosts. In different embodiments, and for different types of middleboxes, this single box may be a single physical appliance (e.g., a separate physical device) or a single virtual machine (which may, in fact, operate on one of the host machines or on a different host machine). For instance, some embodiments may provide a first type of middlebox (e.g., a WAN optimizer) as a virtual machine while providing a second type of middlebox (e.g., an IDS) as a single appliance. In addition, some embodiments may provide both options for a single type of middlebox.

As with the distributed middlebox, in some embodiments the network control system is used to provision a centralized middlebox appliance or virtual machine. Rather than the controller receiving configuration information and identifying numerous nodes to which the configuration information should be distributed, the controller of some embodiments identifies an appliance on which to implement the middlebox and distributes the configuration to the appliance (e.g., through an intermediary controller that manages the appliance. In some embodiments, several physical appliances may exist within the physical network and the controller chooses one of these appliances to implement the middlebox. When the middlebox is implemented as a virtual machine, some embodiments select a host node for the virtual machine and then distribute the configuration to the node. In either case, the network control system also specifies a connection, or attachment, between the middlebox and the various managed switching elements on the host. In some embodiments, the middlebox appliance supports one or more types of tunneling, and the flow entries distributed to the managed switching elements include entries specifying the tunnel encapsulation to use in order to send packets to the middlebox.

When a flow entry in a managed switching element specifies to send traffic to the middlebox, the managed switching element also encapsulates the packet using this tunnel information and sends the packet out of its host through the tunnel to the middlebox. As with the distributed middleboxes, some centralized middleboxes are active middleboxes. That is, the middlebox sends the packet back to the network after performing its middlebox processing. In some embodiments, such middleboxes are configured to always send the packet (as a new packet) to a pool node (e.g., always the same pool node, one of several pool nodes). In FIG. 4, the centralized middlebox 425 sends all of its outgoing traffic to the pool node 430. The pool node, which also implements the logical forwarding elements 205-215, then forwards the packet to the appropriate destination machine.

Just as the distributed middlebox elements may be virtualized to perform middlebox instances for several different logical networks, so may the centralized middlebox 425. The same physical appliance (or virtual machine) may be used by numerous different logical networks. In some embodiments, a similar slicing technique to that used in the distributed architecture is used. That is, the managed switching element adds a tag to indicate the logical network (or particular logical middlebox in the logical network) to which the packet is being sent, and the middlebox 425 uses this tag to identify which of the middlebox instances it implements should be used to process the packet. In some embodiments, the centralized middlebox appliance includes numerous ports, each of which maps to a different virtual middlebox instances. In such embodiments, the slicing technique may not be used, and instead the incoming port is used to identify the correct virtual middlebox.

Figure 5:
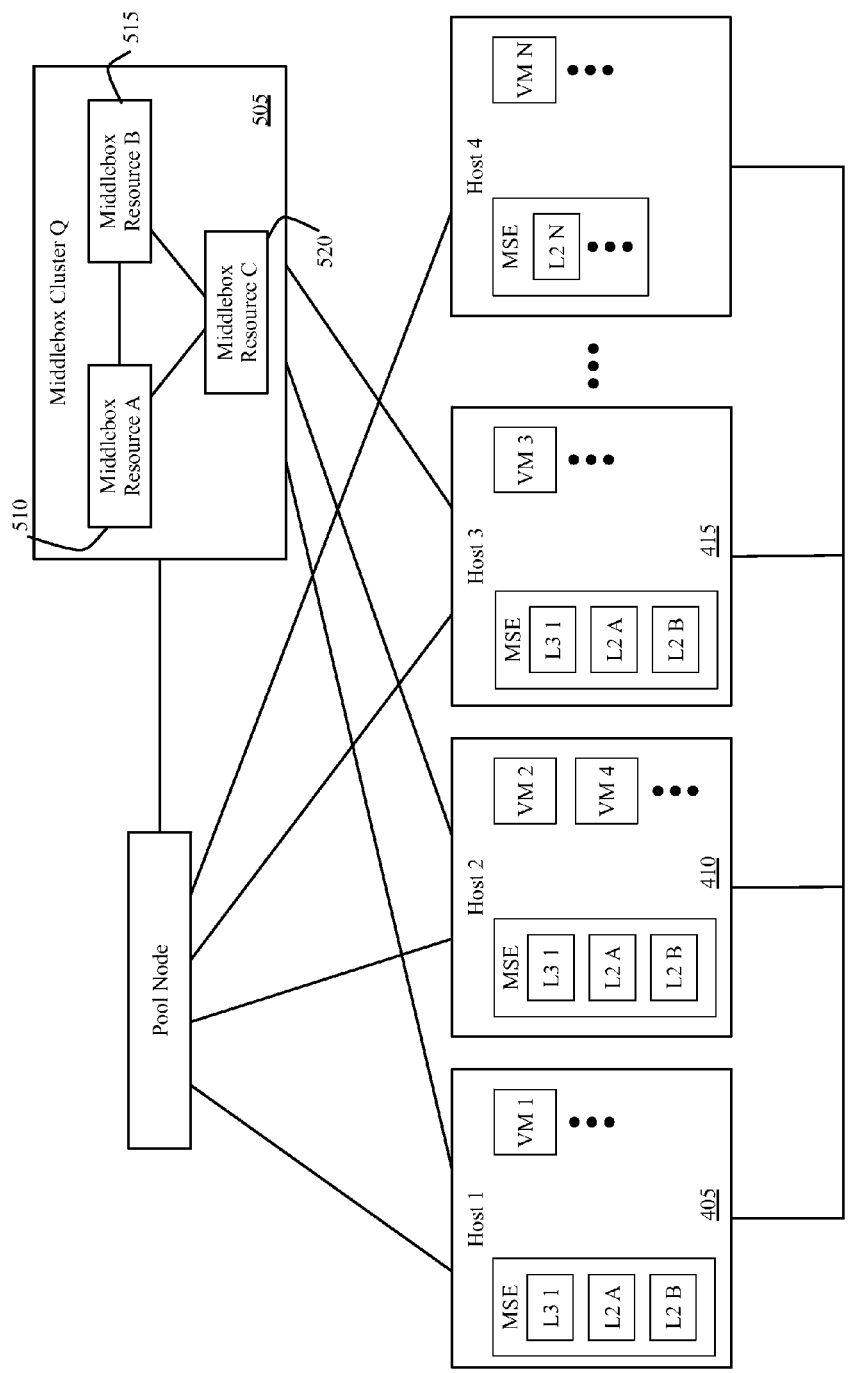
FIG. 5 conceptually illustrates a an implementation of a middlebox as a cluster of resources of some embodiments.

Whereas the middlebox 425 is a single resource, some embodiments implement a middlebox as a centralized cluster of resources, as shown in the implementation 500 of FIG. 5. This example is the same as that shown in FIG. 4 except that, rather than a single middlebox device, the network includes a middlebox cluster 505 with three middlebox resources 510-520. In some embodiments, each of the middlebox resources 510-520 is a separate device or virtual machine (i.e., the equivalent of middlebox 425).

Different embodiments may use different architectures within the middlebox cluster. Some embodiments include an entry point (e.g., a single physical device) to the cluster that load balances packets across the resource pool. Other embodiments have different host machines connected directly to different resources within the cluster. For instance, the network 500 might be set up with the first host machine 405 connected to resource 510, the second host machine 410 connected to resource 515, and the third host machine 415 connected to resource 520. Other embodiments use a master-backup setup in which the cluster has two devices. The host machines all connect to the master, which performs the middlebox processing, while sharing state data with the backup resource.

As described above by reference to FIG. 2, some embodiments use the centralized middlebox implementation when state sharing is required on a per-packet basis. That is, for certain middleboxes, the middlebox processing requires knowledge of all of the packets processed by the middlebox. For a distributed middlebox, this would require an explosion of state updates being sent out over the network connecting the middlebox elements. However, when the middlebox is a single appliance, that single appliance will store all of the state at all times.

For a middlebox cluster such as the cluster 505, this requirement means that state must be shared between the middlebox resources in the cluster at high speeds. Some embodiments use dedicated connections between the middlebox resources to share this state information. That is, a particular port on each middlebox device is dedicated only to state sharing between the several devices in the cluster. Often, a middlebox cluster will only be two machines, or a few machines, operating in close proximity making such dedicated connections more feasible. For situations with more than two middleboxes, some embodiments use a mesh network in which each middlebox resource broadcasts state updates over the network to all other middlebox resources. Other embodiments use a star network in which the middlebox resources transmit their state updates to a central resource that amalgamates the updates and sends them to the other resources. While middlebox clusters require this additional infrastructure as compared to the centralized, case, the clusters have the benefit of being able to handle larger deployments in which a larger number of packets are processed.

As mentioned, both WAN optimizers and intrusion detection systems are examples of middleboxes that some embodiments implement as centralized middleboxes because of the state sharing requirements. The WAN optimizer, for example, increases the efficiency of data transfers across a WAN using various optimization techniques. To perform these optimization techniques requires access to all of the traffic being sent over the WAN, and thus a centralized implementation is more optimal. Furthermore, the WAN optimizer may be used to cache content sent over the WAN, and the caching only serves its purpose if the cache is stored together rather than distributed over numerous hosts.

An intrusion detection system is a passive system (i.e., does not drop or modify packets) that monitors total numbers of connections, the addresses on those connections, the number of packets for each connection, etc. In order to detect intrusions, the IDS looks for patterns in the connections, heuristics, etc., for which the IDS processing must be aware of all of the traffic monitored. If one distributed element has information about a first connection and a second distributed element has information about a second connection, neither element has enough information to properly evaluate the network for an intrusion.

Figure 6:
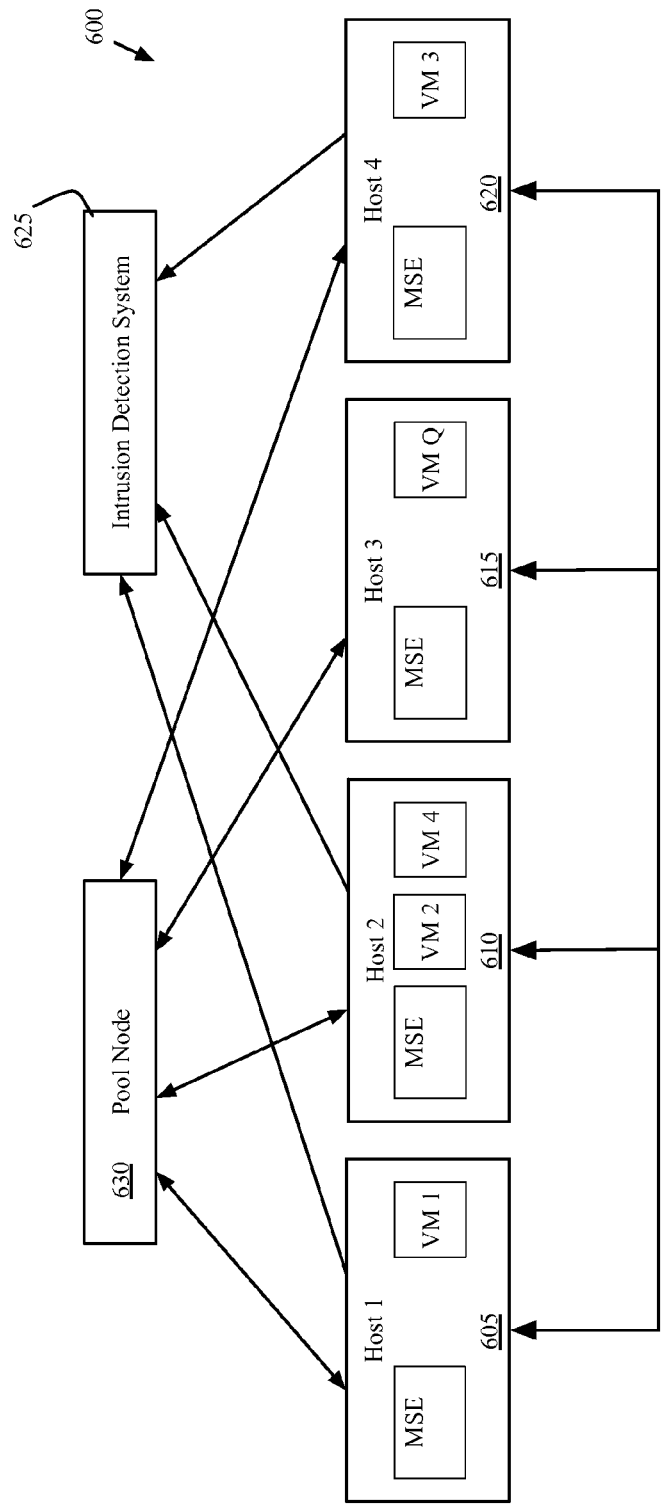
FIG. 6 conceptually illustrates a network that implements a logical network that includes an intrusion detection system of some embodiments.

FIG. 6 conceptually illustrates a network 600 that implements a logical network that includes an intrusion detection system 625 of some embodiments. The logical network includes four virtual machines hosted among three nodes 605, 610, and 620. The logical topology of the logical network in this case is the same as that shown in FIG. 2 (with the IDS as the middlebox), though the aspects of the IDS implementation described here apply to other network topologies as well. The network 600 also includes a fourth node 615 that does not host any of the virtual machines of the particular logical network (but does host at least one virtual machine from another network).

Unlike the previous figures, FIG. 6 shows connections along with arrows to show direction of packet transfer between machines in the system. Thus, for example, all of the hosts 605-620 can send packets to each other in both directions. That is, virtual machines at host 605 send packets to virtual machines at 620 (via the managed switching element at host 605 and then the managed switching element at host 620), and the virtual machines at host 620 also send packets to the virtual machines at host 605. In addition, all of the MSEs at the hosts may use the pool node to process packets for which the edge MSEs cannot make a forwarding decision.

Each of the host machines 605, 610, and 620, that host virtual machines from the particular logical network, send packets to the IDS. In some embodiments, all traffic on the logical network is sent to the IDS. However, these arrows are unidirectional, as the intrusion detection system of some embodiments is a passive middlebox. Some embodiments, rather than forwarding traffic through the middlebox, send a duplicate packet to the IDS box 625. The IDS receives these duplicate packets (i.e., a packet for each one sent through the network between hosts and/or an external network) and performs its intrusion detection analysis. Because the intrusion detection system 625 does not output any traffic packets, there is no connection needed between the IDS 625 and the pool node 630 in this figure.

II. Distributed Middlebox Implementation

As described above, some embodiments implement one or more different middleboxes in a distributed fashion, with middlebox elements operating in some or all of the host machines on which the virtual machines and managed switching elements of a logical network are located, as compared to the centralized middlebox implementation of some embodiments. This section describes the distributed middlebox implementation of some embodiments within a host machine.

Figure 7:
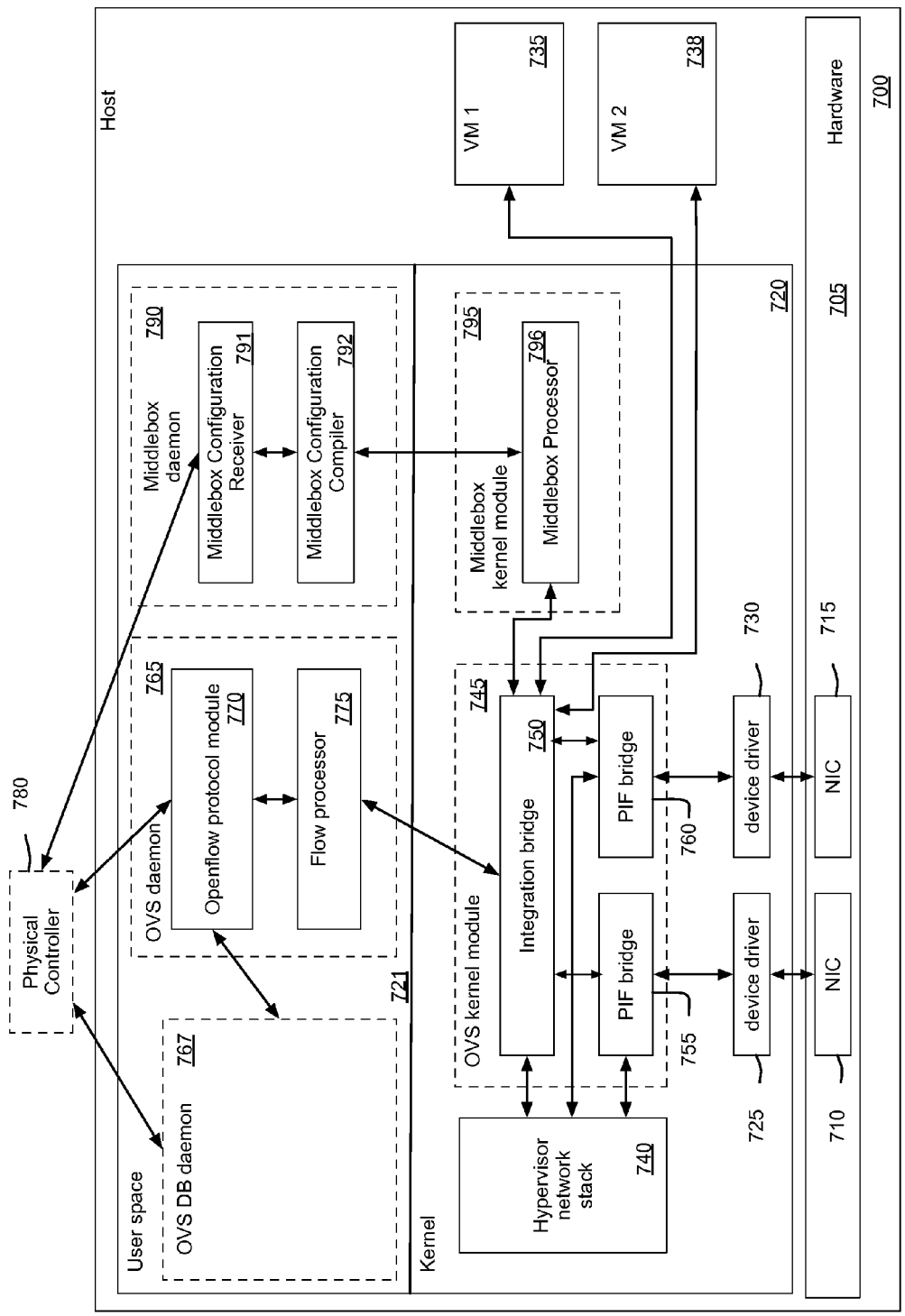
FIG. 7 conceptually illustrates an architectural diagram of a host machine of some embodiments that includes both a distributed software middlebox element and a software switching element.

FIG. 7 conceptually illustrates an architectural diagram of a host machine 700 of some embodiments that includes both a distributed software middlebox element and a software switching element. The distributed software middlebox element may be a network address translation element, a firewall element, a load balancing element, or any other middlebox implemented in a distributed fashion.

In this example, the middlebox element includes three components on the host machine—a middlebox daemon 790 that runs in the user space of the host machine 700 and a middlebox kernel module 795 that runs in the kernel of the host machine 700. While this figure illustrates the distributed middlebox element as two components for the purpose of explanation, the middlebox daemon 790 and the middlebox kernel module 795 collectively form the middlebox element running on the host machine 700. The software switching element (an open virtual switch ("OVS"), in this example) includes three components—an OVS kernel module 745 that runs in the kernel of the host machine 700, and an OVS daemon 765 and an OVS database (DB) daemon 767, which both run in the user space of the host machine.

As illustrated in FIG. 7, the host 700 includes hardware 705, kernel 720, user space 721, and VMs 785-795. The hardware 705 may include typical computer hardware, such as processing units, volatile memory (e.g., random access memory (RAM)), non-volatile memory (e.g., hard disk drives, flash memory, optical discs, etc.), network adapters, video adapters, or any other type of computer hardware. As shown, the hardware 705 includes NICs 710 and 715, which in some embodiments are typical network interface controllers for connecting a computing device to a network.

As shown in FIG. 7, the host machine 700 includes a kernel 720 and a user space 721. In some embodiments, the kernel is the most basic component of an operating system that runs on a separate memory space and is responsible for managing system resources (e.g., communication between hardware and software resources). In contrast, the user space is a memory space where all user mode applications may run.

The kernel 720 of some embodiments is a software abstraction layer that runs on top of the hardware 705 and runs below any operating system. In some embodiments, the kernel 720 performs virtualization functionalities (e.g., to virtualize the hardware 705 for several virtual machines operating on the host machine). The kernel 720 is then part of a hypervisor, in some embodiments. The kernel 720 handles various management tasks, such as memory management, processor scheduling, or any other operations for controlling the execution of the VMs 735 and 738 operating on the host machine.

As shown, the kernel 720 includes device drivers 725 and 730 for the NICs 710 and 715, respectively. The device drivers 725 and 730 allow an operating system (e.g., of a virtual machine) to interact with the hardware of the host 700. In this example, the device driver 725 allows interaction with the NIC 710, while the driver 730 allows interaction with the NIC 715. The kernel 720 may include other device drivers (not shown) for allowing the virtual machines to interact with other hardware (not shown) in the host 700.

The virtual machines 735 and 738 are independent virtual machines running on the host machine 700 (e.g., user virtual machines such as those shown in FIGS. 3-6), using resources virtualized by the kernel 720. As such, the VMs run any number of different operating systems. Examples of such operations systems include Solaris, FreeBSD, or any other type of Unix-based operating system. Other examples include Windows-based operating systems as well.

As shown, the user space 721 of the host machine 700 includes the middlebox daemon 790, the OVS daemon 765, and the OVS DB daemon 767. Other applications (not shown) may be included in the user space 721 as well, including daemons for additional distributed middleboxes (e.g., firewalls, load balancers, network address translators, etc.). The OVS daemon 765 is an application that runs in the user space 721. Some embodiments of the OVS daemon 765 communicate with a network controller 780 in order to receive instructions, as described in further detail below, for processing and forwarding packets sent to and from the virtual machines 735 and 738. The OVS daemon 765 of some embodiments communicates with the network controller 780 through the Open-Flow protocol, while other embodiments use different communication protocols for transferring the physical control plane data. Additionally, in some embodiments the OVS daemon 765 retrieves configuration information from the OVS DB daemon 767 after the network controller 780 transmits the configuration information to the OVS DB daemon.

In some embodiments, the OVS DB daemon 767 also runs in the user space 721. The OVS DB daemon 767 of some embodiments communicates with the network controller 780 in order to configure the OVS switching element (e.g., the OVS daemon 765 and/or the OVS kernel module 745). For instance, the OVS DB daemon 767 receives configuration information from the network controller 780 and stores the configuration information in a set of databases. In some embodiments, the OVS DB daemon 767 communicates with the network controller 780 through a database communication protocol. In some cases, the OVS DB daemon 767 may receive requests for configuration information from the OVS daemon 765. The OVS DB daemon 767, in these cases, retrieves the requested configuration information (e.g., from a set of databases) and sends the configuration information to the OVS daemon 765.

The OVS daemon 765 includes an OpenFlow protocol module 770 and a flow processor 775. The OpenFlow protocol module 770 communicates with the network controller 780 to receive configuration information (e.g., flow entries) from the network controller 780 for configuring the software switching element. When the module 770 receives configuration information from the network controller 780, it translates the configuration information into information understandable by the flow processor 775.

The flow processor 775 manages the rules for processing and routing packets. For instance, the flow processor 775 stores rules (e.g., in a storage medium, such as a disk drive) received from the OpenFlow protocol module 770. In some embodiments, the rules are stored as a set of flow tables that each includes a set of flow entries. The flow processor 775 handles packets for which integration bridge 750 (described below) does not have a matching rule. In such cases, the flow processor 775 matches the packets against its stored rules. When a packet matches a rule, the flow processor 775 sends the matched rule and the packet to the integration bridge 750 for the integration bridge 750 to process. This way, when the integration bridge 750 receives a similar packet that matches the generated rule, the packet will be matched against the generated exact match rule in the integration bridge 750 and the flow processor 775 will not have to process the packet.

In some embodiments, the flow processor 775 may not have a rule to which the packet matches. In such cases, some embodiments of the flow processor 775 send the packet to another managed switching element (e.g., a pool node) for handling packets that cannot be processed by an edge switching element. However, in other cases, the flow processor 775 may have received from the network controller 780 a catchall rule that drops the packet when a rule to which the packet matches does not exist in the flow processor 775.

As illustrated in FIG. 7, the kernel 720 includes a hypervisor network stack 740 and an OVS kernel module 745. The hypervisor network stack 740 is an Internet Protocol (IP) network stack in some embodiments. The hypervisor network stack 740 processes and routes IP packets that are received from the OVS kernel module 745 and the PIF bridges 755 and 760. When processing a packet that is destined for a network host external to the host 700, the hypervisor network stack 740 determines to which of the physical interface (PIF) bridges 755 and 760 the packet should be sent.

The OVS kernel module 745 processes and routes network data (e.g., packets) between VMs running on the host 700 and network hosts external to the host 700 (e.g., network data received through the NICs 710 and 715). In some embodiments, the OVS kernel module 745 implements the forwarding tables of the physical control plane for one or more logical networks. To facilitate the processing and routing of network data, the OVS kernel module 745 communicates with OVS daemon 765 (e.g., to receive flow entries from the OVS daemon 765). In some embodiments, the OVS kernel module 745 includes a bridge interface (not shown) that allows the hypervisor network stack 740 to send packets to and receive packets from the OVS kernel module 745.

FIG. 7 illustrates that the OVS kernel module 745 includes an integration bridge 750 and the PIF bridges 755 and 760. In some embodiments, the OVS kernel module 745 includes a PIF bridge for each NIC in the hardware 705. In other embodiments, a PIF bridge in the OVS kernel module 745 may interact with more than one NIC in the hardware 705.

The PIF bridges 755 and 760 route network data between the hypervisor network stack 740 and network hosts external to the host 700 (i.e., network data received through the NICs 710 and 715)

The integration bridge 750 processes and routes packets received from the hypervisor network stack 740, the VMs 735 and 738 (e.g., through VIFs), and the PIF bridges 755 and 760. In some embodiments, the integration bridge 750 stores a subset of the rules stored in the flow processor 775 (and/or rules derived from rules stored in the flow processor 775) that the integration bridge 750 is currently using or was recently using to process and forward packets.

In some embodiments, the flow processor 775 of some embodiments is responsible for managing rules in the integration bridge 750. In some embodiments, the integration bridge 750 stores only active rules. The flow processor 775 monitors the rules stored in the integration bridge 750 and removes the active rules that have not been access for a defined amount of time (e.g., 1 second, 3 seconds, 5, seconds, 10 seconds, etc.). In this manner, the flow processor 775 manages the integration bridge 750 so that the integration bridge 750 stores rules that are being used or have recently been used.

Although FIG. 7 illustrates one integration bridge, the OVS kernel module 745 may include multiple integration bridges. For instance, in some embodiments, the OVS kernel module 745 includes a separate integration bridge for each logical switching element that is implemented across a managed network to which the software switching element belongs. That is, the OVS kernel module 745 has a corresponding integration bridge for each logical switching element that is implemented across the managed network.

The above description relates to the forwarding functions of the managed software switching element of some embodiments. Just as the software switching element includes a user space component that implements the control plane (the OVS daemon 765) and a kernel component that implements the data plane (the OVS kernel module 745), the distributed middlebox element of some embodiments includes a control plane component operating in the user space (the middlebox daemon 790) and a data plane component operating in the kernel (the middlebox kernel module 795).

As shown, the middlebox daemon 790 includes a middlebox configuration receiver 791 and a middlebox configuration compiler 792. The middlebox configuration receiver 791 communicates with the network controller 780 in order to receive the configuration for the middlebox, as well as slicing information. The middlebox configuration, in some embodiments, is a set of records (e.g., in the same form as flow entry records received by the OVS daemon) describing the middlebox packet processing rules. For example, a firewall configuration includes a set of packet processing rules describing when to drop packets, allow packets, etc. (similar to ACL entries, but also including TCP connection state as a factor in the decisions). A source network address translation configuration includes a set of hidden IP addresses of virtual machines that should be mapped into an exposed IP address by the translator. A load balancer configuration, in some embodiments, includes the network address translation mapping of an exposed IP address into several different hidden virtual machine addresses, as well as a load balancing (scheduling) algorithm for determining to which of several machines new TCP connections should be sent.

As described above, the slicing information assigns an identifier to a particular middlebox instance to be performed by the distributed middlebox element. In some embodiments, the identifier is bound to a particular logical middlebox in a particular tenant's logical network. That is, when a particular logical network includes several different middleboxes with different processing rules, the middlebox daemon 790 will create several middlebox instances. Each of these instances is identified with a different slice identifier on packets sent to the middlebox. In addition, in some embodiments the middlebox daemon 790 assigns a particular internal identifier for each of these instances, which the middlebox uses in its internal processing (e.g., in order to keep track of active TCP connections).

The middlebox daemon 790 also includes a middlebox configuration compiler 792. In some embodiments, the middlebox configuration compiler 792 receives the middlebox configuration (e.g., the packet processing, modification, or analysis rules) for a particular middlebox instance in a first language, and compiles these into a set of rules in a second language more optimized for the internal processing of the middlebox. The middlebox configuration compiler 792 sends the compiled packet processing rules to the middlebox processor 796 of the middlebox kernel module 795.

The middlebox kernel module 795 processes packets sent from and/or to VMs running on the host 700 in order to determine whether to allow the packets through, drop the packets, etc. As shown, the middlebox kernel module 795 includes a middlebox processor 795 to perform these functions. The middlebox processor 795 receives translated middlebox rules for a particular middlebox instance from the middlebox configuration compiler 792. In some embodiments, these translated middlebox rules specify a packet processing pipeline within the middlebox.

In order to receive packets from the managed switching element, the middlebox processor 796 of some embodiments connects to a software port abstraction on the integration bridge 750 of the OVS kernel module. Through this port on the integration bridge, the managed switching element sends packets to the middlebox and receives packets from the middlebox after processing by the middlebox (unless the middlebox drops the packet). As described, these packets include a slice identifier tag used by the middlebox processor 796 to determine which set of compiled packet processing rules to apply to the packet.

The architectural diagram of the distributed middlebox and software switching element illustrated in FIG. 7 is one exemplary configuration. One of ordinary skill in the art will recognize that other configurations are possible. For instance, in some embodiments the middlebox processor that applies the compiled packet processing rules is located in the user space 721 rather than the kernel 720. In such embodiments, the kernel exposes the network interfaces 710 and 715 for full control by the user space so that the middlebox processor can perform its functions in the user space without a loss of speed as compared to the kernel.

III. Network Control System

Section I above described the different middlebox implementation architectures, from fully distributed to fully centralized. As mentioned, in some embodiments these middleboxes may be provisioned through a network control system that is also used to provision the managed switching elements that implement the logical forwarding elements of the network. In some embodiments, the network control system is a hierarchical set of network controllers.

Figure 8:
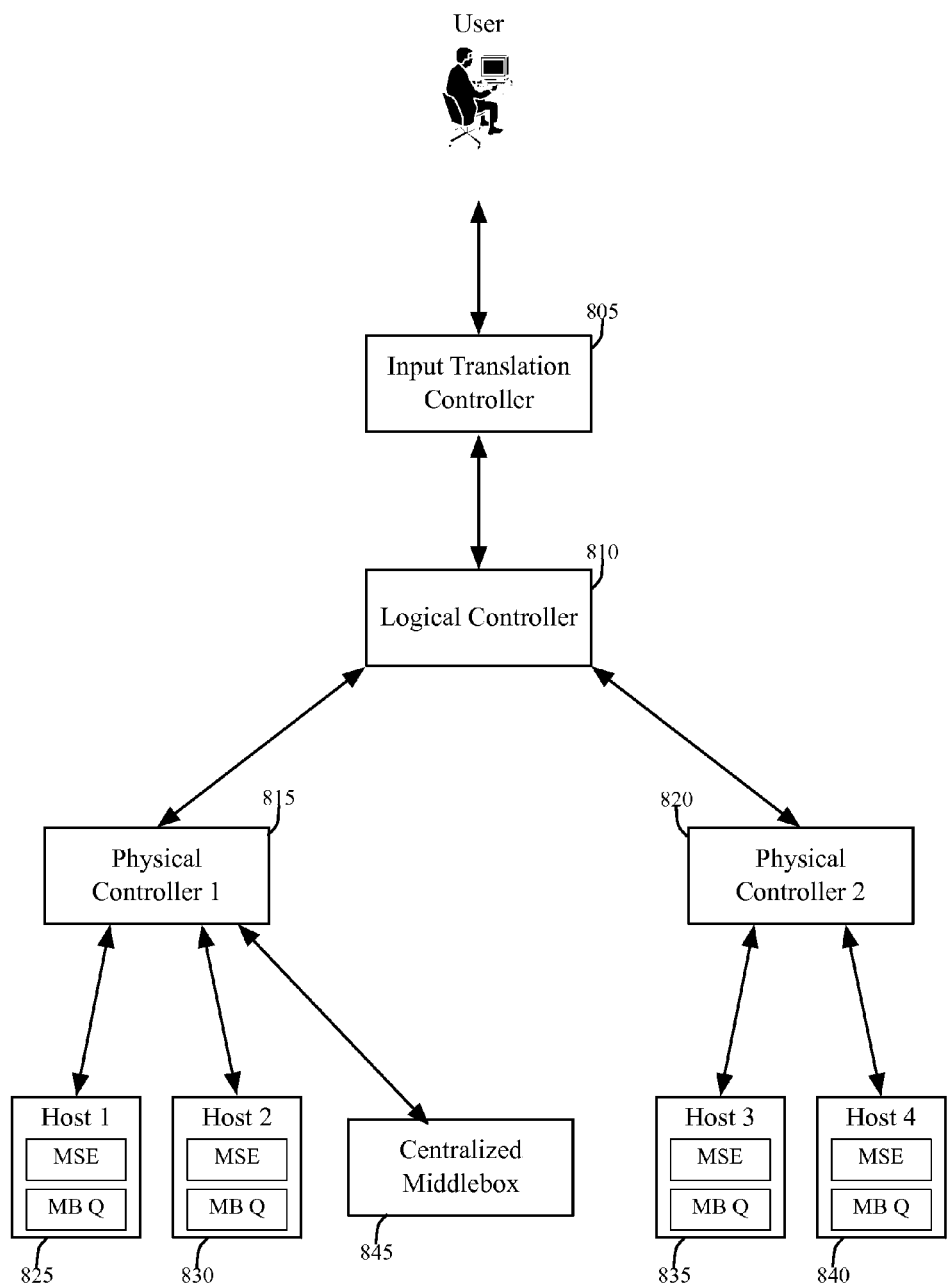
FIG. 8 illustrates a network control system of some embodiments for configuring managed switching elements and distributed middlebox elements in order to implement logical networks.

FIG. 8 illustrates a network control system 800 of some embodiments for configuring managed switching elements and distributed middlebox elements in order to implement logical networks. As shown, the network control system 800 includes an input translation controller 805, a logical controller 810, physical controllers 815 and 820, hosts 825-840, and a centralized middlebox 845. As shown, the hosts 830-865 include both managed switching elements and middlebox elements, which may be implemented as shown above in FIG. 7. One of ordinary skill in the art will recognize that many other different combinations of the various controllers and hosts are possible for the network control system 800.

In some embodiments, each of the controllers in a network control system has the capability to function as an input translation controller, logical controller, and/or physical controller. Alternatively, in some embodiments a given controller may only have the functionality to operate as a particular one of the types of controller (e.g., as a physical controller). In addition, different combinations of controllers may run in the same physical machine. For instance, the input translation controller 805 and the logical controller 810 may run in the same computing device, with which a user interacts.

Furthermore, each of the controllers illustrated in FIG. 8 (and subsequent FIG. 9) is shown as a single controller. However, each of these controllers may actually be a controller cluster that operates in a distributed fashion to perform the processing of a logical controller, physical controller, or input translation controller.

The input translation controller 805 of some embodiments includes an input translation application that translates network configuration information received from a user. For example, a user may specify a network topology such as that shown in FIG. 2, which includes a specification as to which machines belong in which logical domain. This effectively specifies a logical data path set, or a set of logical forwarding elements. For each of the logical switches, the user specifies the machines that connect to the logical switch (i.e., to which logical ports are assigned for the logical switch). In some embodiments, the user also specifies IP addresses for the machines. The input translation controller 805 translates the entered network topology into logical control plane data that describes the network topology. For example, an entry might state that a particular MAC address A is located at a particular logical port X of a particular logical switch.

In some embodiments, each logical network is governed by a particular logical controller (e.g., logical controller 810). The logical controller 810 of some embodiments translates the logical control plane data into logical forwarding plane data, and the logical forwarding plane data into universal control plane data. Logical forwarding plane data, in some embodiments, consists of flow entries described at a logical level. For the MAC address A at logical port X, logical forwarding plane data might include a flow entry specifying that if the destination of a packet matches MAC A, forward the packet to port X.

The universal physical control plane data of some embodiments is a data plane that enables the control system of some embodiments to scale even when it contains a large number of managed switching elements (e.g., thousands) to implement a logical data path set. The universal physical control plane abstracts common characteristics of different managed switching elements in order to express physical control plane data without considering differences in the managed switching elements and/or location specifics of the managed switching elements.

As stated, the logical controller 510 of some embodiments translates logical control plane data into logical forwarding plane data (e.g., logical flow entries), then translates the logical forwarding plane data into universal control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., nLog tables), and the controller applications use a table mapping engine to translate between the data planes.

Each of the physical controllers 815 and 820 is a master of one or more managed switching elements (e.g., located within host machines). In this example, each of the two physical controllers is a master of two managed switching elements. Furthermore, the physical controller 815 is the master of the centralized middlebox 845. In some embodiments, a physical controller receives the universal physical control plane information for a logical network and translates this data into customized physical control plane information for the particular managed switches that the physical controller manages. In other embodiments, the physical controller passes the appropriate universal physical control plane data to the managed switch, which includes the ability (e.g., in the form of a chassis controller running on the host machine) to perform the conversion itself.

The universal physical control plane to customized physical control plane translation involves a customization of various data in the flow entries. For the example noted above, the universal physical control plane would involve several flow entries. The first entry states that if a packet matches the particular logical data path set (e.g., based on the packet being received at a particular logical ingress port), and the destination address matches MAC A, then forward the packet to logical port X. This flow entry will be the same in the universal and customized physical control planes, in some embodiments. Additional flows are generated to match a physical ingress port (e.g., a virtual interface of the host machine) to the logical ingress port X (for packets received from MAC A, as well as to match logical port X to the particular egress port of the physical managed switch. However, these physical ingress and egress ports are specific to the host machine containing the managed switching element. As such, the universal physical control plane entries include abstract physical ports while the customized physical control plane entries include the actual physical ports involved.

In some embodiments, the network control system also disseminates data relating to the middleboxes of a logical network. The network control system may disseminate middlebox configuration data, as well as data relating to the sending and receiving of packets to/from the middleboxes at the managed switches and to/from the managed switches at the middleboxes.

As shown in FIG. 8, the same network control system distributes data to both distributed and centralized middleboxes in some embodiments. Several physical controllers are used to disseminate the configuration of a distributed middlebox, whereas some embodiments assign a specific physical controller to a centralized middlebox appliance. In this case, the physical controller 815 is assigned to disseminate the configuration of the centralized middlebox 845, while the configuration for the distributed middlebox is disseminated through both of the physical controllers 815 and 820.

In order to incorporate the middleboxes, the flow entries propagated through the network control system to the managed switches will include entries for sending the appropriate packets to the appropriate middleboxes (e.g., flow entries that specify for packets having a source IP address in a particular subnet to be forwarded to a particular middlebox). In addition, the flow entries for the managed switch will need to specify how to send such packets to the middleboxes. That is, once a first entry specifies a logical egress port of the logical router to which a particular middlebox is bound, additional entries are required to attach the logical egress port to the middlebox.

For the centralized middlebox 845, these additional entries will match the logical egress port of the logical router to a particular physical port of the host machine (e.g., a physical network interface) through which the host machine connects to the middlebox. In addition, the entries include encapsulation information for sending the packet to the centralized middlebox appliance via a tunnel between the host machine and the middlebox.

For the distributed middlebox, the packet does not have to actually leave the host machine in order to reach the middlebox. However, the managed switching element nevertheless needs to include flow entries for sending the packet to the middlebox element on the host machine. These flow entries, again, include an entry to map the logical egress port of the logical router to the port through which the managed switching element connects to the middlebox. However, in this case the middlebox attaches to a software abstraction of a port in the managed switching element, rather than a physical (or virtual) interface of the host machine. That is, a port is created within the managed switching element, to which the middlebox element attaches. The flow entries in the managed switching element send packets to this port in order for the packets to be routed within the host machine to the middlebox.

For both the distributed and centralized middleboxes, in some embodiments the managed switching element adds slicing information to the packet. Essentially, this slicing information is a tag that indicates to which of the (potentially) several instances being run by the middlebox the packet should be sent. Thus, when the middlebox receives the packet, the tag enables the middlebox to use the appropriate set of packet processing, analysis, modification, etc. rules in order to perform its operations on the packet. Some embodiments, rather than adding slicing information to the packet, either define different ports of the managed switching element for each middlebox instance, and essentially use the ports to slice the traffic destined for the firewall (in the distributed case), or connect to different ports of the centralized appliance to differentiate between the instances (in the centralized case).

Figure 9:
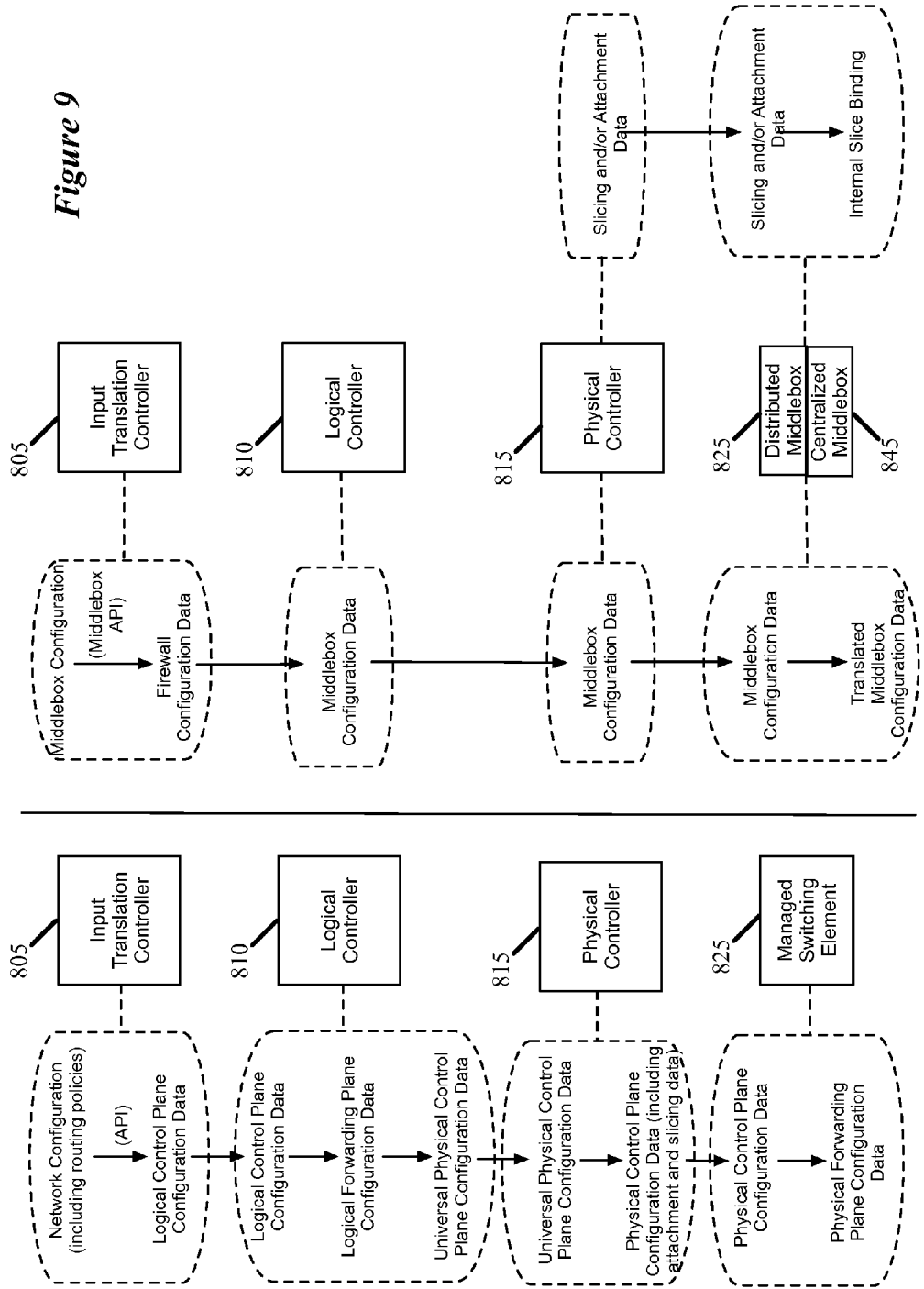
FIG. 9 conceptually illustrates the propagation of data through the network control system of some embodiments.

The above describes the propagation of the forwarding data to the managed switching elements. In addition, some embodiments use the network control system to propagate configuration data to the middleboxes. FIG. 9 conceptually illustrates the propagation of data through the network control system of some embodiments. On the left side of the figure is the data flow to the managed switching elements that implement a logical network, while the right side of the figure shows the propagation of both middlebox configuration data as well as network attachment and slicing data to the middleboxes.

On the left side, the input translation controller 805 receives a network configuration through an API, which is converted into logical control plane data. This network configuration data includes a logical topology such as that shown in FIG. 2. In addition, the network configuration data of some embodiments includes routing policies that specify which packets are sent to the middlebox. When the middlebox is located on a logical wire between two logical forwarding elements (e.g., between a logical router and a logical switch), then all packets sent over that logical wire will automatically be forwarded to the middlebox. However, for an out-of-band middlebox such as that in network architecture 200, the logical router will only send packets to the middlebox when particular policies are specified by the user.

Whereas routers and switches will normally forward packets according to the destination address (e.g., MAC address or IP address) of the packet, policy routing allows forwarding decisions to be made based on other information stored by the packet (e.g., source addresses, a combination of source and destination addresses, etc.). For example, the user might specify that all packets with source IP addresses in a particular subnet, or that have destination IP addresses not matching a particular set of subnets, should be forwarded to the middlebox.

As shown, the logical control plane data is converted by the logical controller 810 (specifically, by the control application of the logical controller) to logical forwarding plane data, and then subsequently (by the virtualization application of the logical controller) to universal physical control plane data. In some embodiments, these conversions generate a flow entry (at the logical forwarding plane), then adds a match over the logical data path set (at the universal physical control plane). The universal physical control plane also includes additional flow entries for mapping generic physical ingress ports (i.e., a generic abstraction of a port not specific to any particular physical host machine) to logical ingress ports as well as for mapping logical egress ports to generic physical egress ports. For instance, for the mapping to a centralized middlebox, the flow entries at the universal physical control plane would include a forwarding decision to send a packet to the logical port to which the middlebox connects when a routing policy is matched, as well as a mapping of the logical port to a generic physical port of a host machine that connects to the middlebox.

The physical controller 815 (one of the several physical controllers), as shown, translates the universal physical control plane data into customized physical control plane data for the particular managed switching elements 830-840 that it manages. This conversion involves substituting specific data (e.g., specific physical ports) for the generic abstractions in the universal physical control plane data. For instance, in the example of the above paragraph, the port integration entries are configured to specify the physical layer port appropriate for the particular middlebox configuration. This port might be a virtual NIC if the firewall runs as a virtual machine on the host machine, or the previously-described software port abstraction within the managed switching element when the firewall runs as a process (e.g., daemon) within the hypervisor on the virtual machine. In some embodiments, for the latter situation, the port is an IPC channel or TUN/TAP device-like interface. In some embodiments, the managed switching element includes one specific port abstraction for the firewall module and sends this information to the physical controller in order for the physical controller to customize the physical control plane flows. For the flow entries to send packets to the centralized middlebox 845, on the other hand, the inserted port will be an actual physical port of the particular host machine on which the managed switching element operates.

In addition, in some embodiments the physical controller adds flow entries specifying slicing information particular to the middlebox. For instance, for a particular managed switching element, the flow entry may specify to add a particular tag (e.g., a VLAN tag or similar tag) to a packet before sending the packet to the particular firewall. This slicing information enables the middlebox to receive the packet and identify which of its several independent instances should process the packet.

The managed switching element 825 (one of several MSEs managed by the physical controller 815) performs a translation of the customized physical control plane data into physical forwarding plane data. The physical forwarding plane data, in some embodiments, are the flow entries stored within a switching element (either a physical router or switch or a software switching element) against which the switching element actually matches received packets.

The right side of FIG. 9 illustrates two sets of data propagated to a middleboxes (either the centralized or distributed middlebox) rather than the managed switching elements. The first of these sets of data is the actual middlebox configuration data that includes various rules specifying the operation of the particular logical middlebox. This data may be received at the input translation controller 805 or a different input interface, through an API particular to the middlebox implementation. In some embodiments, different middlebox implementations will have different interfaces presented to the user (i.e., the user will have to enter information in different formats for different particular middleboxes). As shown, the user enters a middlebox configuration, which is translated by the middlebox API into middlebox configuration data.

In some embodiments, the middlebox configuration data is a set of records, with each record specifying a particular rule. These records, in some embodiments, are in a similar format to the flow entries propagated to the managed switching elements. In fact, some embodiments use the same applications on the controllers to propagate the firewall configuration records as for the flow entries, and the same table mapping language (e.g., nLog) for the records.

The middlebox configuration data, in some embodiments, is not translated by the logical or physical controller, while in other embodiments the logical and/or physical controller perform at least a minimal translation of the middlebox configuration data records. As many middlebox packet processing, modification, and analysis rules operate on the IP address (or TCP connection state) of the packets, and the packets sent to the middlebox will have this information exposed (i.e., not encapsulated within the logical port information), the middlebox configuration does not require translation from logical to physical data planes. Thus, the same middlebox configuration data is passed from the input translation controller 805 (or other interface), to the logical controller 810, to the physical controller 815.

In some embodiments, the logical controller 810 stores a description of the logical network and of the physical implementation of that physical network. The logical controller receives the one or more middlebox configuration records for a distributed middlebox, and identifies which of the various nodes (i.e., host machines) will need to receive the configuration information. In some embodiments, the entire middlebox configuration is distributed to middlebox elements at all of the host machines, so the logical controller identifies all of the machines on which at least one virtual machine resides whose packets require use of the middlebox. This may be all of the virtual machines in a network (e.g., as for the middlebox shown in FIG. 2), or a subset of the virtual machines in the network (e.g., when a firewall is only applied to traffic of a particular domain within the network). Some embodiments make decisions about which host machines to send the configuration data to on a per-record basis. That is, each particular rule may apply only to a subset of the virtual machines, and only hosts running these virtual machines need to receive the record.

Once the logical controller identifies the particular nodes to receive the records, the logical controller identifies the particular physical controllers that manage these particular nodes. As mentioned, each host machine has an assigned master physical controller. Thus, if the logical controller identifies only first and second hosts as destinations for the configuration data, the physical controllers for these hosts will be identified to receive the data from the logical controller (and other physical controllers will not receive this data). For a centralized middlebox, the logical controller needs only to identify the (single) physical controller that manages the appliance implementing the middlebox.

In order to supply the middlebox configuration data to the hosts, the logical controller of some embodiments pushes the data (using an export module that accesses the output of the table mapping engine in the logical controller) to the physical controllers. In other embodiments, the physical controllers request configuration data (e.g., in response to a signal that the configuration data is available) from the export module of the logical controller.

The physical controllers pass the data to the middlebox elements on the host machines that they manage, much as they pass the physical control plane data. In some embodiments, the middlebox configuration and the physical control plane data are sent to the same database running on the host machine, and the managed switching element and middlebox module retrieve the appropriate information from the database. Similarly, for a centralized middlebox 845, the physical controller 815 passes the middlebox configuration data to the middlebox appliance (e.g., to a database for storing configuration data).

In some embodiments, the middlebox translates the configuration data. The middlebox configuration data will be received in a particular language to express the packet processing, analysis, modification, etc. rules. The middlebox (distributed and/or centralized) of some embodiments compiles these rules into more optimized packet classification rules. In some embodiments, this transformation is similar to the physical control plane to physical forwarding plane data translation. When a packet is received by the middlebox, it applies the compiled optimized rules in order to efficiently and quickly perform its operations on the packet.

In addition to the middlebox configuration rules, the middlebox modules receive slicing and/or attachment information in order to receive packets from and send packets to the managed switching elements. This information corresponds to the information sent to the managed switching elements. As shown, in some embodiments the physical controller 815 generates the slicing and/or attachment information for the middlebox (i.e., this information is not generated at the input or logical controller level of the network control system).

For distributed middleboxes, the physical controllers, in some embodiments, receive information about the software port of the managed switching element to which the middlebox connects from the managed switching element itself, then passes this information down to the middlebox. In other embodiments, however, the use of this port is contracted directly between the middlebox module and the managed switching element within the host machine, so that the middlebox does not need to receive the attachment information from the physical controller. In some such embodiments, the managed switching element nevertheless transmits this information to the physical controller in order for the physical controller to customize the universal physical control plane flow entries for receiving packets from and sending packets to the middlebox.

For centralized middleboxes, some embodiments provide tunneling attachment data to the middlebox. The middlebox, in some embodiments, will need to know the type of tunnel encapsulation various host machines will use to send packets to the middlebox. In some embodiments, the middlebox has a list of accepted tunneling protocols (e.g., STT, GRE, etc.), and the chosen protocol is coordinated between the managed switching element(s) and the middlebox. The tunneling protocol may be entered by the user as part of the middlebox configuration, or may be automatically determined by the network control system in different embodiments. In addition to the connections to the host machines, a tunnel will be set up between the centralized middlebox and the pool node to which it sends packets after processing, as described by reference to FIG. 4 above.

The slicing information generated by the physical controller, in some embodiments, consists of an identifier for the middlebox instance to be used for the particular logical network. In some embodiments, as described, the middlebox, whether operating on the host machine or as a centralized appliance, is virtualized for use by multiple logical networks. When the middlebox receives a packet from the managed switching element, in some embodiments the packet includes a prepended tag (e.g., similar to a VLAN tag) that identifies a particular one of the middlebox instances (i.e., a particular configured set of rules) to use in processing the packet.

As shown in FIG. 9, the middlebox translates this slicing information into an internal slice binding. In some embodiments, the middlebox uses its own internal identifiers (different from the tags prepended to the packets) in order to identify states (e.g., active TCP connections, statistics about various IP addresses, etc.) within the middlebox. Upon receiving an instruction to create a new middlebox instance and an external identifier (that used on the packets) for the new instance, some embodiments automatically create the new middlebox instance and assign the instance an internal identifier. In addition, the middlebox stores a binding for the instance that maps the external slice identifier to the internal slice identifier.

Figure 10:
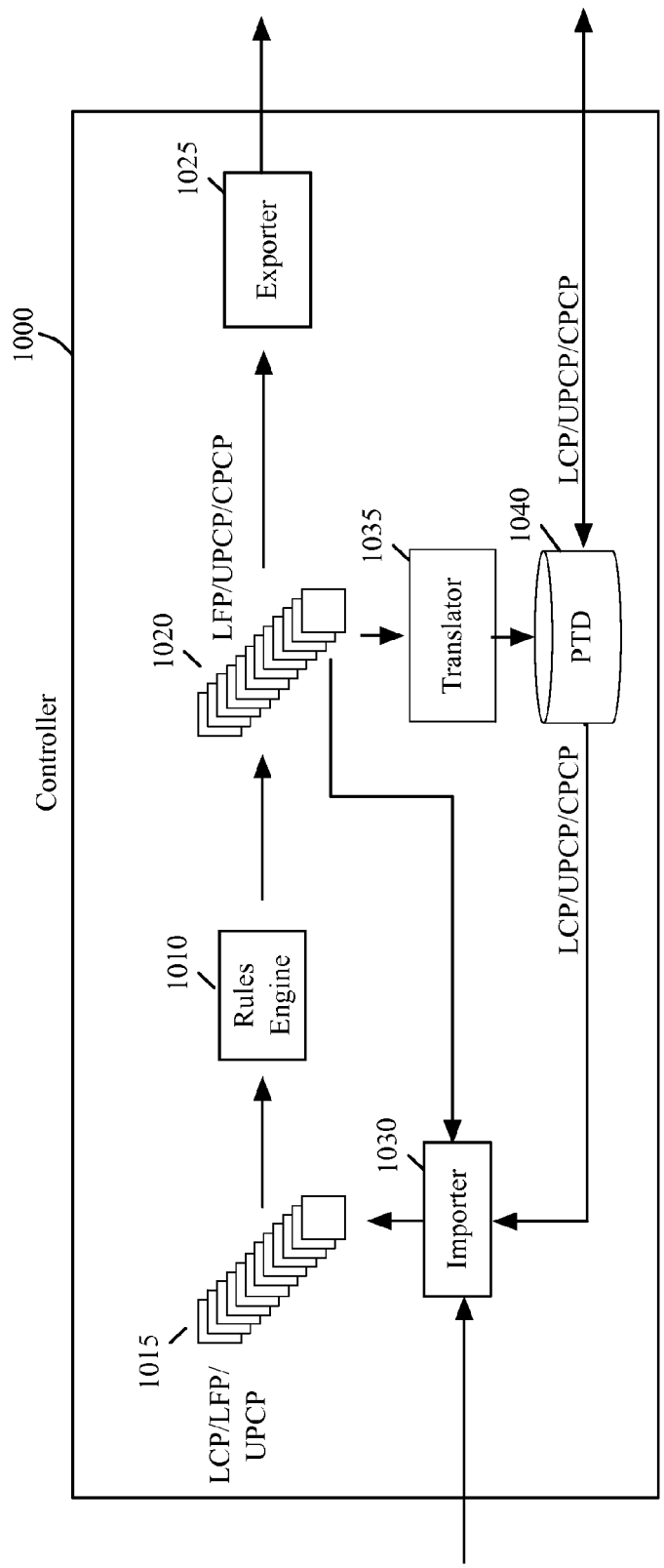
FIG. 10 illustrates example architecture of a network controller of some embodiments.

The above figures illustrate various physical and logical network controllers. FIG. 10 illustrates example architecture of a network controller (e.g., a logical controller or a physical controller) 1000. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to universal physical control plane (UPCP) data, and/or UPCP data to be mapped to customized physical control plane (CPCP) data. The input set of tables may also include middlebox configuration data to be sent to another controller and/or a distributed middlebox instance. The network controller 1000, as shown, includes input tables 1015, a rules engine 1010, output tables 1020, an importer 1030, an exporter 1035, a translator 1035, and a persistent data storage (PTD) 1040.

In some embodiments, the input tables 1015 include tables with different types of data depending on the role of the controller 1000 in the network control system. For instance, when the controller 1000 functions as a logical controller for a user's logical forwarding elements, the input tables 1015 include LCP data and LFP data for the logical forwarding elements. When the controller 1000 functions as a physical controller, the input tables 1015 include LFP data. The input tables 1015 also include middlebox configuration data received from the user or another controller. The middlebox configuration data is associated with a logical datapath set parameter that identifies the logical switching elements to which the middlebox to be is integrated.

In addition to the input tables 1015, the control application 1000 includes other miscellaneous tables (not shown) that the rules engine 1010 uses to gather inputs for its table mapping operations. These miscellaneous tables include constant tables that store defined values for constants that the rules engine 1010 needs to perform its table mapping operations (e.g., the value 0, a dispatch port number for resubmits, etc.). The miscellaneous tables further include function tables that store functions that the rules engine 1010 uses to calculate values to populate the output tables 1025.

The rules engine 1010 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 1010 includes an event processor (not shown), several query plans (not shown), and a table processor (not shown). Each query plan is a set of rules that specifies a set of join operations that are to be performed upon the occurrence of an input table event. The event processor of the rules engine 1010 detects the occurrence of each such event. In some embodiments, the event processor registers for callbacks with the input tables for notification of changes to the records in the input tables 1015, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 1020.

Some embodiments use a variation of the datalog database language to allow application developers to create the rules engine for the controller, and thereby to specify the manner by which the controller maps logical datapath sets to the controlled physical switching infrastructure. This variation of the datalog database language is referred to herein as nLog. Like datalog, nLog provides a few declaratory rules and operators that allow a developer to specify different operations that are to be performed upon the occurrence of different events. In some embodiments, nLog provides a limited subset of the operators that are provided by datalog in order to increase the operational speed of nLog. For instance, in some embodiments, nLog only allows the AND operator to be used in any of the declaratory rules.

The declaratory rules and operations that are specified through nLog are then compiled into a much larger set of rules by an nLog compiler. In some embodiments, this compiler translates each rule that is meant to address an event into several sets of database join operations. Collectively the larger set of rules forms the table mapping rules engine that is referred to as the nLog engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 1015, the output tables 1020 include tables with different types of data depending on the role of the controller 1000. When the controller 1000 functions as a logical controller, the output tables 1015 include LFP data and UPCP data for the logical switching elements. When the controller 1000 functions as a physical controller, the output tables 1020 include CPCP data. Like the input tables, the output tables 1015 may also include the middlebox configuration data. Furthermore, the output tables 1015 may include a slice identifier when the controller 1000 functions as a physical controller.

In some embodiments, the output tables 1020 can be grouped into several different categories. For instance, in some embodiments, the output tables 1020 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 1025 to export the change to another controller or a MSE. An output table can be an RE input table, a RE output table, or both an RE input table and a RE output table.

The exporter 1025 detects changes to the RE output tables of the output tables 1020. In some embodiments, the exporter registers for callbacks with the RE output tables for notification of changes to the records of the RE output tables. In such embodiments, the exporter 1025 detects an output table event when it receives notification from a RE output table that one of its records has changed.

In response to a detected output table event, the exporter 1025 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 1000 does not keep in the output tables 1020 the data for logical datapath sets that the controller is not responsible for managing (i.e., for logical networks managed by other logical controllers). However, such data is translated by the translator 1035 into a format that can be stored in the PTD 1040 and is then stored in the PTD. The PTD 1040 propagates this data to PTDs of one or more other controllers so that those other controllers that are responsible for managing the logical datapath sets can process the data.

In some embodiments, the controller also brings the data stored in the output tables 1020 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 1030 interfaces with a number of different sources of input data and uses the input data to modify or create the input tables 1010. The importer 1020 of some embodiments receives the input data from another controller. The importer 1020 also interfaces with the PTD 1040 so that data received through the PTD from other controller instances can be translated and used as input data to modify or create the input tables 1010. Moreover, the importer 1020 also detects changes with the RE input tables in the output tables 1030.

IV. Example Implementation of Several Middleboxes

Figure 11:
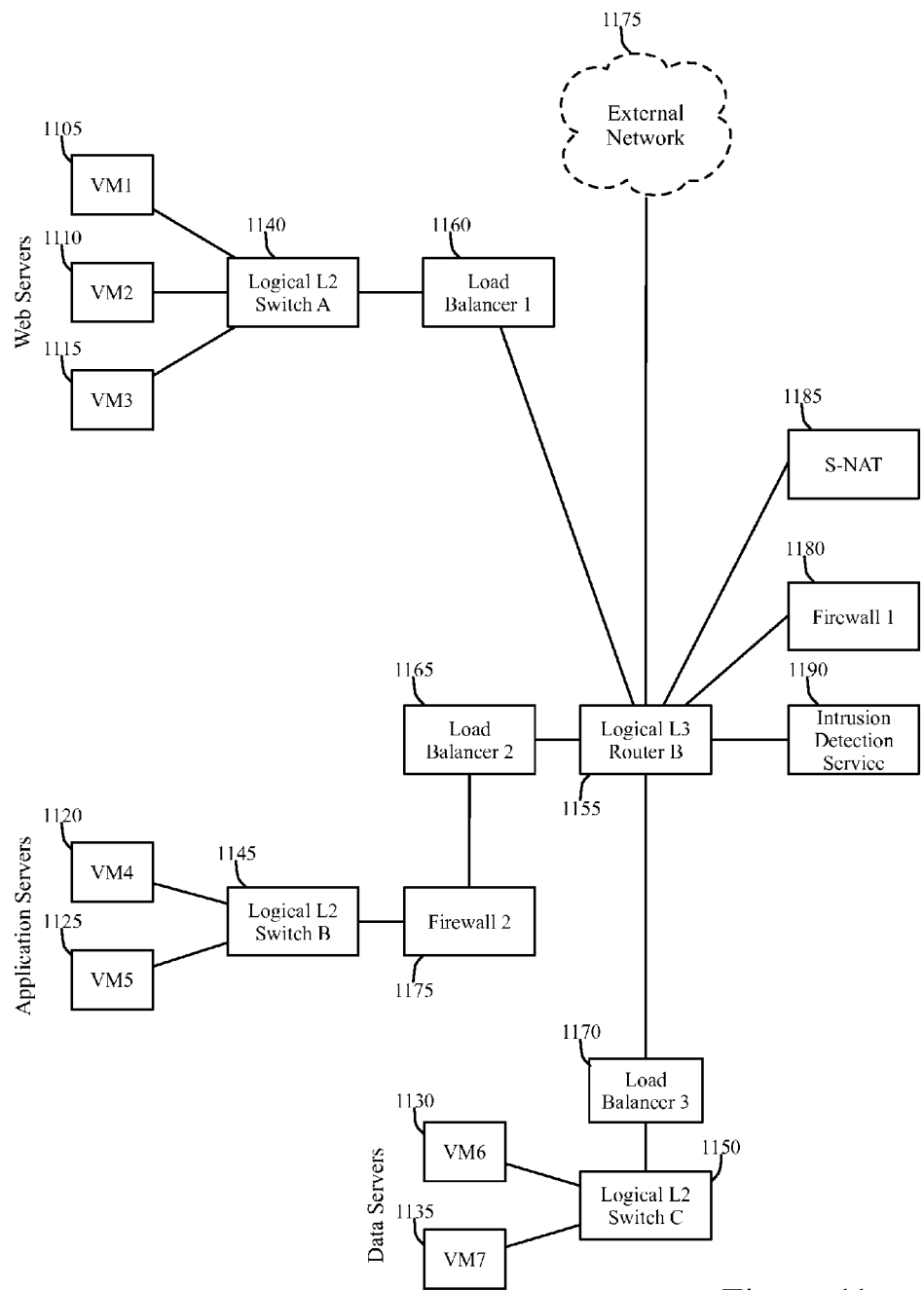
FIG. 11 conceptually illustrates a complex logical network topology involving numerous middleboxes.

The above describes various principles for implementing and configuring both distributed and centralized middleboxes. The example network shown in FIG. 2 above is a simplified example with only a single middlebox. FIG. 11, on the other hand, conceptually illustrates a more complex logical network topology 1100 involving numerous middleboxes.

The logical network 1100 includes three logical L2 domains: web servers 1105-1115 connected to a first logical L2 switch 1140, application servers 1120 and 1125 connected to a second logical L2 switch 1145, and data servers 1130 and 1135 connected to a third logical switch 1150. Each of these logical switches 1140-1150 connects to a logical router 1155 (through various middleboxes).

Between each logical switch and the logical router 1155 is a load balancer, in order for the load balancer to schedule incoming traffic to the particular logical L2 domain. That is, the first load balancer 1160 performs destination network address translation (D-NAT) to balance traffic (e.g., on a per transport connection basis) between the three web servers 1105-1115, the second load balancer 1165 performs D-NAT to balance traffic between the two application servers 1120 and 1125, and the third load balancer 1170 performs D-NAT to balance traffic between the two data servers 1130 and 1135. In addition, between the logical router 1155 and the second logical switch 1145 is a firewall 1175.

The logical router 1155 also connects the three logical L2 domains to an external network 1195, from which client requests may come into the network. In addition, three middleboxes hang off of the L3 router 1155 for processing traffic between the managed network and the external network. These middleboxes include a firewall 1180 for processing incoming traffic, and a source NAT 1185 for converting the real IP addresses of outgoing traffic into one or more virtual IP addresses. These middleboxes are effectively located between the managed network and the external network; however, because the physical implementation involves sending a packet to the middlebox and then receiving a packet back from the middlebox (either to send to the external network 1195 or the appropriate host machine), the logical topology illustrates these middleboxes as out-of-band middleboxes hanging off the router. Finally, an IDS 1190 also hangs off of the logical router 1155. In the network 1100, the logical router forwards a duplicate of all processed packets to the IDS 1190 for analysis.

Figure 12:
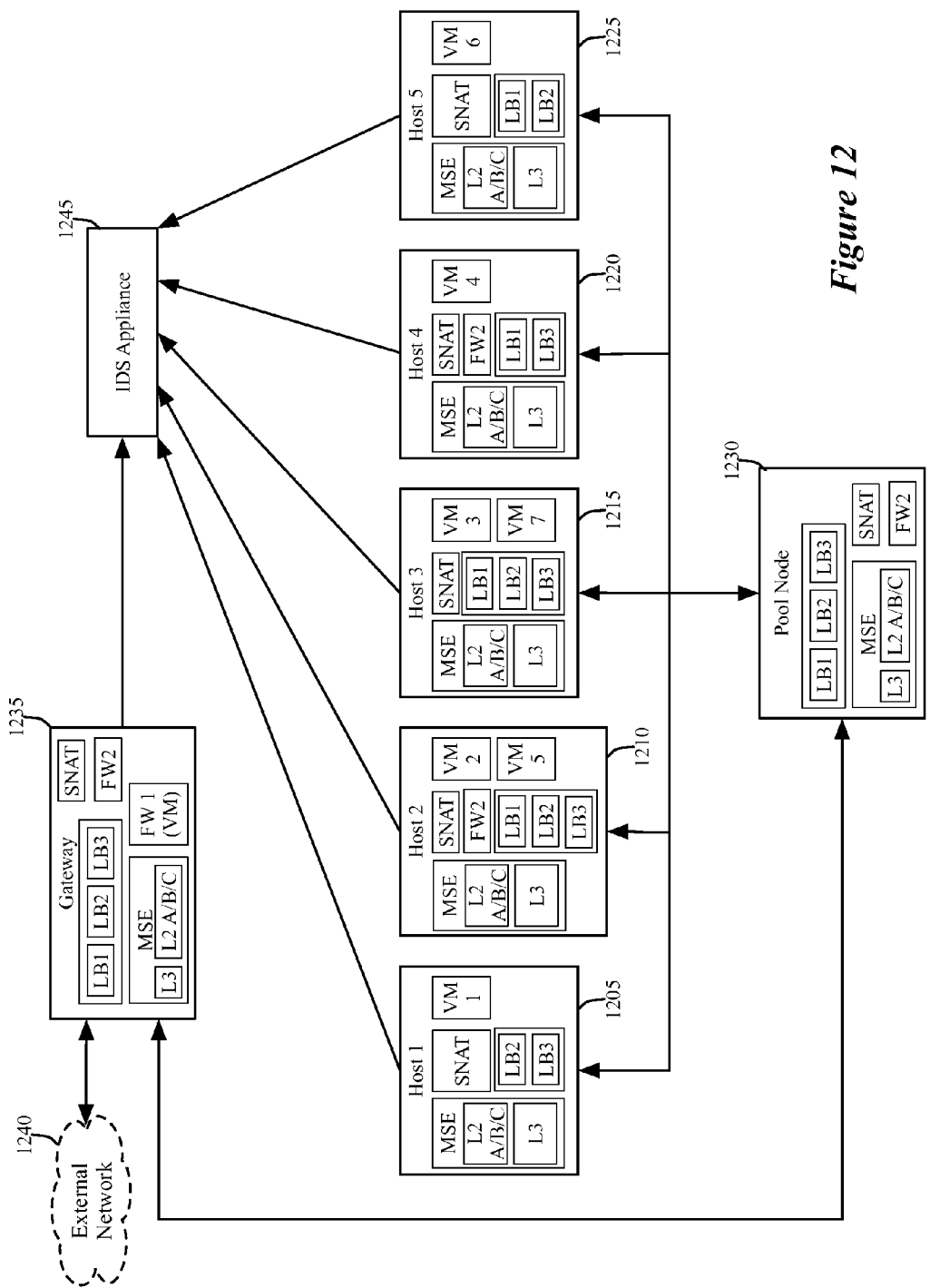
FIG. 12 conceptually illustrates one particular physical implementation of the network of FIG. 11 in a hosted, virtualized environment.

FIG. 12 conceptually illustrates one particular physical implementation 1200 of the network 1100 in a hosted, virtualized environment. As shown, the seven virtual machines 1105-1135 are distributed across five different host machines 1205-1225. Some of the host machines only host one virtual machine, while other host two VMs. The host machines 1205-1225 connect to each other as well as a pool node 1230, which connects to a gateway (also referred to as an extender) 1235. The gateway 1235 connects the managed network 1200 to an external network 1240 (e.g., the Internet, a different managed network, an external private network, etc.). While this example illustrates the gateway 1230 as only connected to the host machines 1205-1225 through the pool node 1230, some embodiments implement a direct connection between the gateway and the host machines.

As shown, each host machine 1205-1225, as well as the pool node 1230 and the gateway 1235, includes a managed switching element. All of the host machines 1205-1225 are configured to include the flow entries for the logical router 1155 as well as the logical switches 1140-1150. Thus, the second host machine 1210 that includes an application server 1125 as well as a web server 1110 and the fifth host machine 1225 that only includes a data server 1130 implement the same managed switching elements. The managed switching element in the gateway 1235 implements the logical router 1155 as well as all three of the logical switches 1140-1150 of the logical network 1100. The pool node, in some embodiments, is also a managed switching element that implements the L3 router 1155 and all three logical switches 1140-1150.

In the implementation 1200, some of the logical middleboxes are distributed, while others are centralized. For instance, the intrusion detection service 1190 is implemented as a centralized IDS appliance 1245. Each of the host machines 1205-1225 connects directly to the IDS appliance 1245, as does the gateway 1235. As shown, these machines only send packets to the IDS appliance, and do not receive packets back. This is because the IDS only receives duplicate packets (incoming packets from the gateway 1235, and outgoing packets from the host machines 1205-1225), and performs analysis to detect threats, but does not send the packets anywhere after analyzing them.

The S-NAT middlebox 1185 is distributed among each of the host machines (e.g., as a daemon running within the hypervisor), as all of the virtual machines may send packets to the external network that require an IP address translation to hide the real IPs behind a virtual IP address. The firewall 1175 is distributed as well, but only implemented on the host machines 1210 and 1220, because these are the nodes that host the application server virtual machines 1120 and 1125 that are behind this firewall.

The three load balancers 1160-1170 are implemented across the various host machines 1205-1225, as well as the gateway 1235. As shown, the load balancers are implemented within a load balancer element in each of the host machines, such that the load balancer element is virtualized (i.e., sliced) to implement several different load balancers. Whereas the firewall 1175 is located at the host machines where the application servers are each implemented, each particular logical load balancer is located on each node that hosts a machine for which the particular load balancer is not responsible. This is because, for example, the load balancer 1170 receives any packet destined for the virtual IP address representing the data servers 1130 and 1135, determines to which of the two data servers to forward the packet, then modifies the destination IP address to reflect the selected data server. As the processing is performed at the first hop (packet source) whenever possible, this functionality is not needed at the nodes hosting the data servers (unless other virtual machines are also hosted), but rather at the nodes hosting the other virtual machines that may send packets to the data servers 1130 and 1135. Accordingly, the load balancer element in the gateway 1235 is sliced to implement all three load balancers, as incoming packets from the external network 1240 may be destined for any of the three logical L2 domains.

In addition, as shown, some embodiments implement any distributed middleboxes for the logical network within the pool node 1230 and the gateway 1235 as well. Because it may be difficult to determine at the outset which middleboxes will be needed at which locations (and a user may subsequently modify routing policies, middlebox configuration, or network architecture), some embodiments do not presume that certain physical machines will not require a particular middlebox. Along the same lines, some embodiments do not distribute different middleboxes to different subsets of the hosts. Instead, all middleboxes for the logical network are implemented at each host at which the logical network is present.

The firewall 1180, for processing incoming packets between the external network 1180 and the managed network, is implemented in a centralized fashion in a virtual machine (rather than a module running in a hypervisor) in the gateway. When the gateway receives incoming packets, it automatically routes the packets to the firewall VM in some embodiments. While in this example the firewall VM is located in the gateway, some embodiments implement the firewall as a virtual machine in a host machine (e.g., a different host machine than those hosting the user VMs), or using a firewall appliance.

In order to configure the network 1100, in some embodiments a user enters the network topology into a logical controller (e.g., via an input translation controller) as shown above by reference to FIGS. 8 and 9. In some embodiments, the user enters the connections between the switches, routers, middleboxes, and virtual machines. Based on the locations of the various network components, the input translation controller or logical controller generates logical control plane data and converts this into flow entries in the logical forwarding plane. However, for middleboxes such as the firewall 1180, S-NAT 1185, and IDS 1190, the user also has to enter policy routing rules indicating when to send packets to these components. For instance, the routing policy for the firewall 1180 would be to send all packets with a source IP outside of the logical network, while the routing policy for the S-NAT 1185 would be to send all packets with a source IP in the logical network. The logical controller, after converting the flow entries to the universal physical control plane, identifies which physical controllers should receive which flow entries, and then distributes these flow entries. The physical controllers add the specific port information (unless the host machines include chassis controllers that perform the universal to customized physical control plane translation) and other customizations to the flow entries and distribute them to the managed switching elements.

In addition, the user enters the middlebox configurations for the various load balancers, firewalls, etc. For example, this information would include the scheduling algorithms to use for each of the different load balancers, the virtual IP to real IP mappings for the S-NAT, packet processing rules for the firewalls, etc. The users enter this information through APIs for the various middleboxes, and some embodiments convert this information to records having the same format (e.g., nLog) as the flow entries. The logical controllers identify which middlebox configurations need to be sent to which host machines or centralized middlebox appliances (e.g., the records for the firewall 1175 only need to go to the host machines 1210 and 1220, while the S-NAT records go to all five host machines 1205-1225). The logical controller distributes the records to the appropriate physical controllers, which add slicing information (and, in some cases, tunneling information) and distribute the information to the middleboxes as described above.

The operation of the network will be described by reference to packets incoming from the external network, packets outgoing to the external network, and packets sent from one logical L2 domain to the other. When a packet is sent from a host machine (e.g., a web server), it first arrives at the MSE running on the host. The packet will first enter logical L2 processing by the logical switch, which sends the packet to the logical router (because the packet is outgoing it does not need to be sent to the local load balancer). The logical router (also handled by the MSE at the host machine) sends a duplicate of the packet to the IDS appliance 1245, in addition to sending the packet to the S-NAT processing on the host. The S-NAT processing modifies the source IP address and returns a new packet to the MSE. In some embodiments, if the packet is part of an active TCP session, the S-NAT may have already sent flow entries to the MSE enabling the MSE to perform the modification without the S-NAT processing being involved. The logical router implemented by the MSE then identifies the logical egress port as the port facing the external network, which maps to the physical port to send the packet to the pool node 1230. The pool node forwards the packet to the gateway 1235, which sends the packet out to the external network 1240.

When a packet is received at the gateway 1240 from the external network 1240, the switching element processing in the gateway first sends the packet to the firewall virtual machine. If the firewall does not drop the packet, then the packet is returned to the switching element processing, which identifies the correct slice of the load balancer, tags the packet with this slice information, and sends the packet to the load balancer processing. The load balancer selects a real destination IP and sends a new packet with the IP address modified to reflect the selected destination machine. At this point, the MSE in the gateway sends the packet to the correct host. If the destination VM is one of the application servers 1120 or 1125, the logical router in the MSE of the gateway first sends the packet to the firewall 1175 for processing, and then sends the packet to the correct host after receiving it back from the firewall element. The MSE then delivers the packet to the destination machine.

Packets traveling from one logical domain to the other will not need to travel through the gateway 1235. The packet is initially received at the MSE, which performs L2 switching and then the L3 routing. The logical router identifies the destination domain and tags the packet with the correct load balancer slicing information, then sends the tagged packet to the load balancer. The load balancer modifies the destination IP and returns the packet to the MSE, which then routes the packet to the correct host machine for delivery to the VM.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
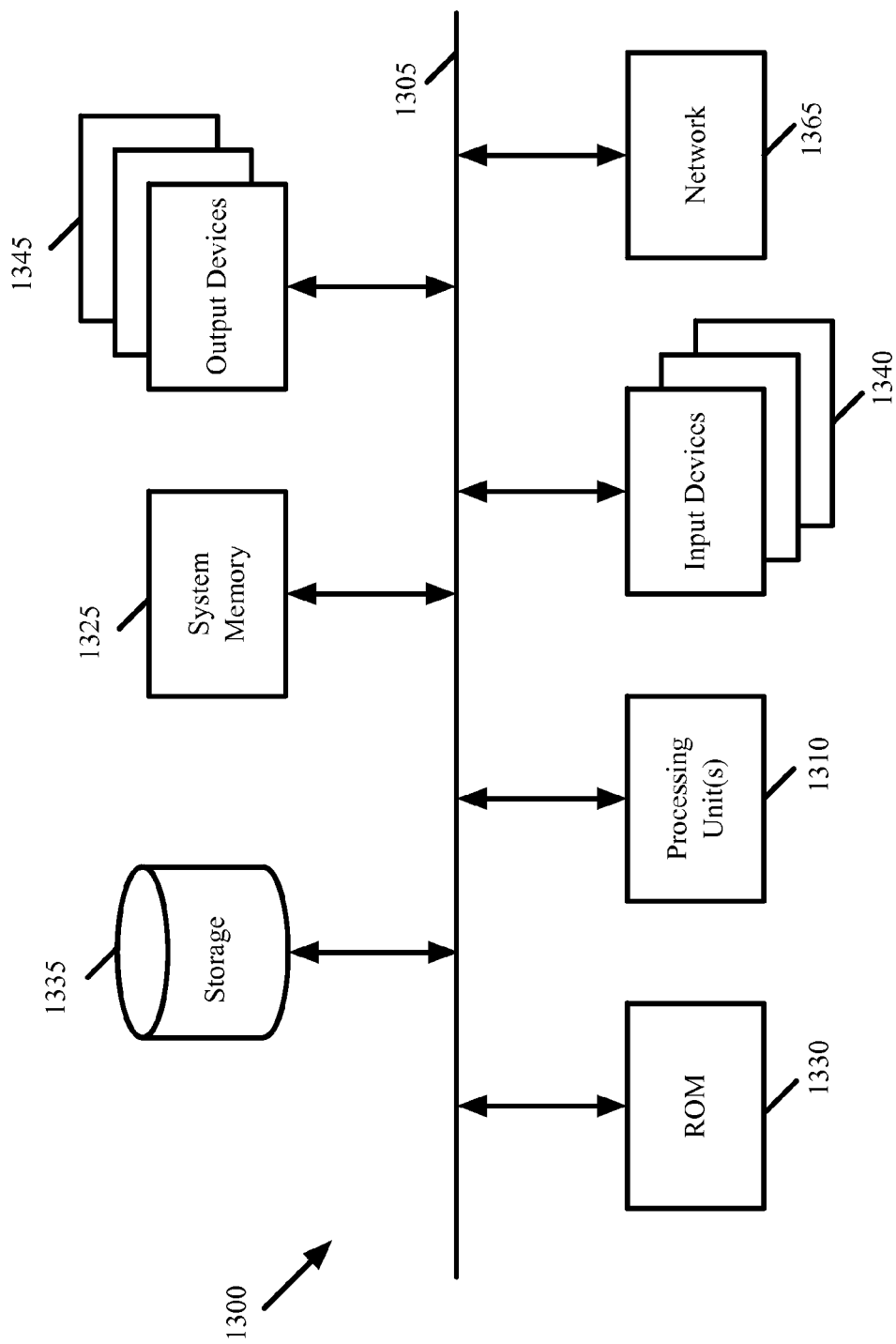
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding drive) as the permanent storage device. Like the permanent storage device 1335, the system memory 1325 is a read-and-write memory device. However, unlike storage device 1335, the system memory 1325 is a volatile read-and-write memory, such a random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for configuring a logical network in a hosting system comprising a plurality of nodes, the method comprising:

receiving a first configuration for a first middlebox of the logical network and a second configuration for a second middlebox of the logical network, the logical network comprising a plurality of end machines hosted on a subset of the plurality of nodes;

identifying the subset of the plurality of the nodes as nodes for implementing the first middlebox;

distributing the first configuration for implementation of the first middlebox on the identified nodes, wherein each of the identified nodes receives the same first configuration for the first middlebox; and distributing the second configuration for implementation of the second middle box on a single physical machine.

2. The method of claim 1, wherein the single physical machine comprises a single node that hosts an end machine for implementing the second middlebox.

3. The method of claim 1, wherein the single physical machine comprises a physical middlebox appliance separate from the plurality of nodes.

4. The method of claim 1, wherein the method is performed by a first network controller.

5. The method of claim 4, wherein distributing the first configuration comprises:

automatically identifying a plurality of additional network controllers that manage the identified nodes; and distributing the first configuration to the identified network controllers for subsequent distribution to the identified nodes.

6. The method of claim 5, wherein each of the identified nodes is managed by a single one of the additional network controllers.

7. The method of claim 4, wherein distributing the second configuration comprises:

automatically identifying a particular additional network controller that manages the single physical machine from a set of additional network controllers; and distributing the second configuration to the identified particular network controller for subsequent distribution to the single physical machine.

8. The method of claim 1, wherein receiving the first configuration for the first middlebox of the logical network and the second configuration for the second middlebox of the logical network comprises receiving a configuration through a first application programming interface (API) specific to the first middlebox and a second configuration through a second API specific to the second middlebox.

9. The method of claim 1, wherein the first configuration is received as a set of database table records, wherein the method does not translate the records before distributing the records.

10. The method of claim 1, wherein the first configuration defines a manner of processing a set of packets by the first middlebox for the plurality of end machines of the logical network.

11. A non-transitory machine readable medium storing a program which when executed by at least one processing unit configures a logical network in a hosting system comprising a plurality of nodes, the program comprising sets of instructions for:

receiving a first configuration for a first middlebox of the logical network and a second configuration for a second middlebox of the logical network, the logical network comprising a plurality of end machines hosted on a subset of the plurality of nodes;

identifying the subset of the plurality of the nodes as nodes for implementing the first middlebox;

distributing the first configuration for implementation of the first middlebox on the identified nodes, wherein each of the identified nodes receives the same first configuration for the first middlebox; and distributing the second configuration for implementation of the second middle box on a single physical machine.

12. The machine readable medium of claim 11, wherein the single physical machine comprises a single node that hosts an end machine for implementing the second middlebox.

13. The machine readable medium of claim 11, wherein the single physical machine comprises a physical middlebox appliance separate from the plurality of nodes.

14. The machine readable medium of claim 11, wherein the program is performed by a first network controller.

15. The machine readable medium of claim 14, wherein the set of instructions for distributing the first configuration comprises sets of instructions for:

automatically identifying a plurality of additional network controllers that manage the identified nodes; and distributing the first configuration to the identified network controllers for subsequent distribution to the identified nodes.

16. The machine readable medium of claim 15, wherein each of the identified nodes is managed by a single one of the additional network controllers.

17. The machine readable medium of claim 14, wherein the set of instructions for distributing the second configuration comprises sets of instructions for:

automatically identifying a particular additional network controller that manages the single physical machine from a set of additional network controllers; and distributing the second configuration to the identified particular network controller for subsequent distribution to the single physical machine.

18. The machine readable medium of claim 11, wherein the set of instructions for receiving the first configuration for the first middlebox of the logical network and the second configuration for the second middlebox of the logical network comprises a set of instructions for receiving a configuration through a first application programming interface (API) specific to the first middlebox and a second configuration through a second API specific to the second middlebox.

19. The machine readable medium of claim 11, wherein the first configuration is received as a set of database table records, wherein the set of instructions for distributing the records does not translate the records before distributing them.

20. The machine readable medium of claim 11, wherein the first configuration defines a manner of processing a set of packets by the first middlebox for the plurality of end machines of the logical network.

21. An apparatus comprising:

a set of processing units for executing sets of instructions; and a machine readable medium storing a program which when executed by at least one of the processing units configures a logical network in a hosting system comprising a plurality of nodes, the program comprising sets of instructions for:

receiving a first configuration for a first middlebox of the logical network and a second configuration for a second middlebox of the logical network, the logical network comprising a plurality of end machines hosted on a subset of the plurality of nodes;

identifying the subset of the plurality of the nodes as nodes for implementing the first middlebox;

distributing the first configuration for implementation of the first middlebox on the identified nodes, wherein each of the identified nodes receives the same first configuration for the first middlebox; and distributing the second configuration for implementation of the second middle box on a single physical machine.

22. The apparatus of claim 21, wherein the program is performed by a first network controller.

23. The apparatus of claim 22, wherein the set of instructions for distributing the first configuration comprises sets of instructions for:
- automatically identifying a plurality of additional network controllers that manage the identified nodes; and
- distributing the first configuration to the identified network controllers for subsequent distribution to the identified nodes.

24. The machine readable medium of claim 23, wherein each of the identified nodes is managed by a single one of the additional network controllers.

25. The apparatus of claim 22, wherein the set of instructions for distributing the second configuration comprises sets of instructions for:
- automatically identifying a particular additional network controller that manages the single physical machine from a set of additional network controllers; and
- distributing the second configuration to the identified particular network controller for subsequent distribution to the single physical machine.

26. The apparatus of claim 21, wherein the set of instructions for receiving the first configuration for the first middlebox of the logical network and the second configuration for the second middlebox of the logical network comprises a set of instructions for receiving a configuration through a first application programming interface (API) specific to the first middlebox and a second configuration through a second API specific to the second middlebox.

* * * * *